(12) United States Patent
Dufour et al.

(10) Patent No.: US 9,079,251 B2
(45) Date of Patent: Jul. 14, 2015

(54) CUTTING INSERTS HAVING DISCONTIGUOUS CLEARANCE FACES

(75) Inventors: Jean-Luc Dufour, Franklin, TN (US);
X. Daniel Fang, Brentwood, TN (US);
David J. Wills, Franklin, TN (US)

(73) Assignee: KENNAMETAL INC., Latrobe, PA (US)

( * ) Notice: Subject to any disclaimer, the term of this patent is extended or adjusted under 35 U.S.C. 154(b) by 874 days.

(21) Appl. No.: 13/280,832

(22) Filed: Oct. 25, 2011

(65) Prior Publication Data

US 2013/0101364 A1  Apr. 25, 2013

(51) Int. Cl.
  B23B 27/16  (2006.01)
  B23B 27/14  (2006.01)
  B23C 5/20  (2006.01)

(52) U.S. Cl.
  CPC ......... *B23B 27/145* (2013.01); *B23B 2200/125* (2013.01); *Y10T 407/22* (2015.01); *Y10T 407/2202* (2015.01); *Y10T 407/23* (2015.01); *Y10T 407/235* (2015.01); *Y10T 407/24* (2015.01)

(58) Field of Classification Search
  CPC .............. B23B 27/145; B23B 220/126; B23B 220/125
  USPC .......... 407/113, 114, 115, 116, 67, 66, 33, 35
  See application file for complete search history.

(56) References Cited

U.S. PATENT DOCUMENTS

| | | | | |
|---|---|---|---|---|
| 3,762,005 A | * | 10/1973 | Erkfritz | 407/113 |
| 4,294,566 A | * | 10/1981 | Boone | 407/114 |
| 5,639,189 A | * | 6/1997 | Hoefler | 407/113 |
| 6,227,772 B1 | * | 5/2001 | Heinloth et al. | 407/113 |
| 6,604,893 B2 | * | 8/2003 | Nelson | 407/35 |
| 8,277,151 B2 | * | 10/2012 | Wandeback | 407/42 |
| 8,500,375 B2 | * | 8/2013 | Heinloth et al. | 407/113 |
| 8,790,049 B2 | * | 7/2014 | Chen | 407/113 |
| 2010/0215446 A1 | | 8/2010 | Wandebäck | |
| 2010/0266354 A1 | | 10/2010 | Zitzlaff et al. | |
| 2013/0101364 A1 | * | 4/2013 | Dufour et al. | 407/67 |

FOREIGN PATENT DOCUMENTS

| | | |
|---|---|---|
| WO | 2004062840 A1 | 7/2004 |
| WO | 2011076835 A1 | 6/2011 |

OTHER PUBLICATIONS

Jan. 3, 2013—TMP-2198PCT—Search_Report.

* cited by examiner

*Primary Examiner* — Will Fridie, Jr.
(74) *Attorney, Agent, or Firm* — Larry R. Meenan

(57) ABSTRACT

Cutting inserts are described having at least two discontiguous clearance faces. Cutting tool systems including the cutting inserts are also described. An indexable cutting insert includes a top face, a bottom face, and at least two clearance faces connecting the top face and the bottom face at a periphery of the cutting insert. The at least two clearance faces include a primary clearance face contiguous with the top face and forming a cutting edge at an intersection of the primary clearance face and the top face, and a secondary clearance face discontiguous with the primary clearance face and separated from the primary clearance face by a bridge surface, and wherein a primary clearance angle formed by the primary clearance face is larger than a secondary clearance angle formed by the secondary clearance face.

32 Claims, 20 Drawing Sheets

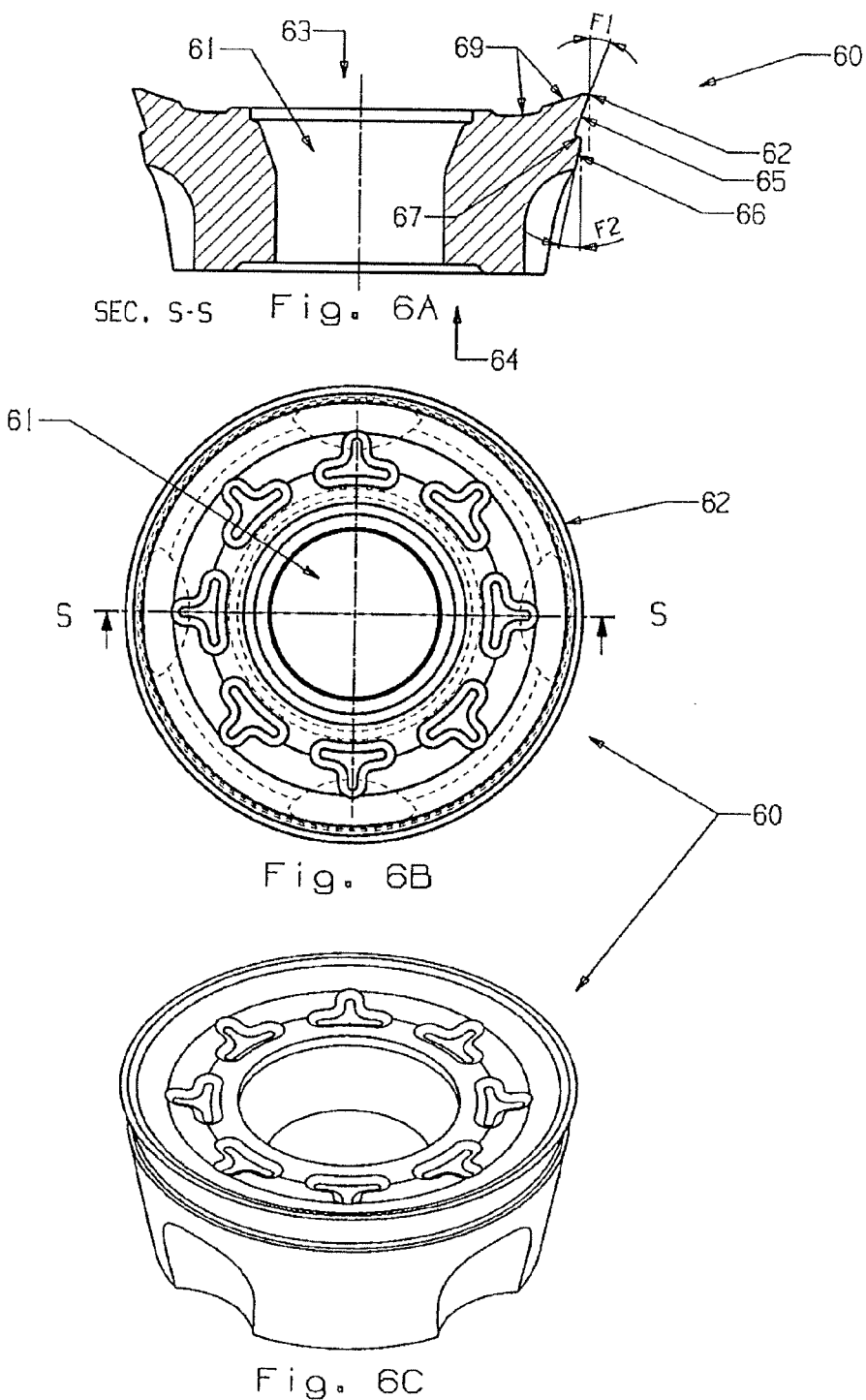

SEC. T-T

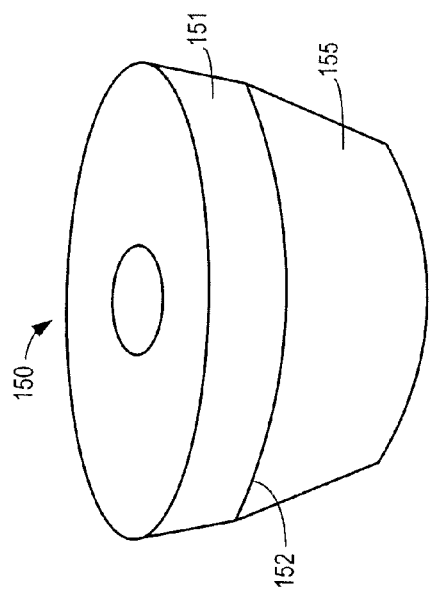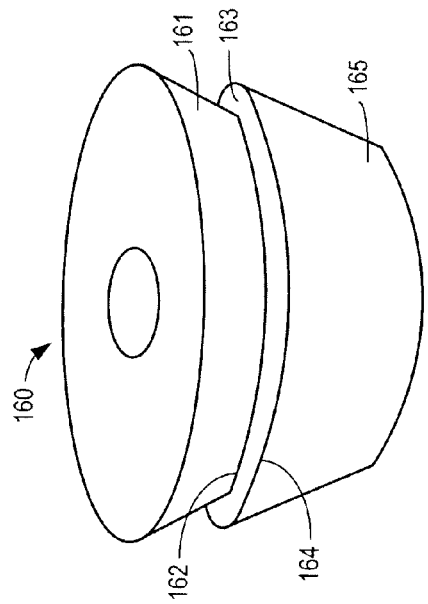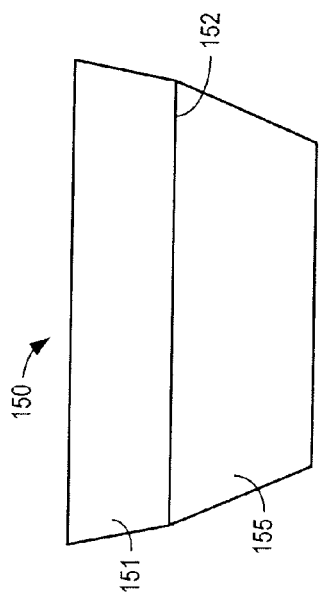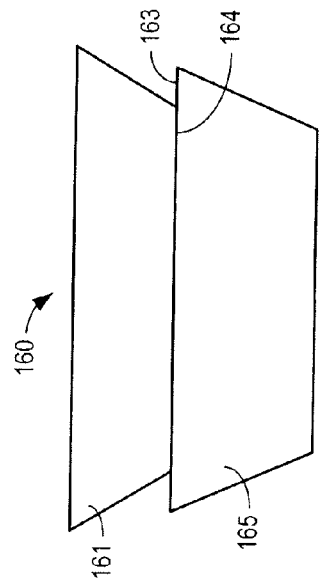

CUTTING INSERTS HAVING DISCONTIGUOUS CLEARANCE FACES

TECHNICAL FIELD

This disclosure generally relates to cutting tools, including cutting tool holders and cutting inserts. In particular, this disclosure relates to indexable and replaceable cutting inserts and to tool holders configured to engage and secure indexable and replaceable cutting inserts such as, for example, inserts and holders for rotary machining tool systems.

BACKGROUND

Indexable cutting inserts for cutting tools include, for example, cutting inserts made of carbide, ceramic, coated carbide, coated ceramic, or other hard materials. Cutting inserts generally have a unitary structure and one or more cutting edges located at various corners or around peripheral edges of the inserts. Indexable cutting inserts are mechanically secured to a tool holder, but the inserts are adjustable and removable in relation to the tool holder. Indexable cutting inserts may be readily re-positioned (i.e., indexed) to present a new cutting edge to engage a workpiece, or indexable cutting inserts may be replaced in a tool holder when the cutting edges dull or fracture, for example. In this manner, indexable insert cutting tools are modular cutting tool assemblies that include at least one cutting insert and a tool holder.

Indexable insert cutting tool systems comprising a tool holder and one or more replaceable and/or indexable cutting inserts are generally more economical than unitary cutting tools. This is so because indexable insert cutting tool systems allow for the indexing and replacement of worn and/or damaged cutting edges/surfaces, whereas unitary cutting tools require scrapping the entire cutting tool when worn out or damaged. However, in indexable cutting tool systems, cutting inserts having different inscribed circle diameters generally require different insert pockets and, therefore, different tool holders, because of the differences in the sizes of the cutting inserts. Likewise, cutting inserts having the same inscribed circle diameter but different cutting clearance angles generally require different insert pockets and, therefore, different tool holders, because of the differences in the contour of the clearance (i.e., flank) surface of the cutting inserts. This increases the cost and complexity of cutting tool systems because multiple tool holders are required to accommodate cutting inserts having different inscribed circle diameters and/or cutting clearance angles.

SUMMARY

In a non-limiting embodiment, an indexable cutting insert comprises a top face, a bottom face, and at least two clearance faces. The at least two clearance faces connect the top face and the bottom face at a periphery of the cutting insert. The at least two clearance faces comprise a primary clearance face and a secondary clearance face. The primary clearance face is contiguous with the top face and forms a cutting edge at the intersection of the primary clearance face and the top face. The secondary clearance face is discontiguous with the primary clearance face and is separated from the primary clearance face by a bridge surface. A primary clearance angle formed by the primary clearance face is larger than a secondary clearance angle formed by the secondary clearance face.

In another non-limiting embodiment, a cutting insert comprises a primary clearance face contiguous with a rake face. The primary clearance face forms a cutting edge at the intersection with the rake face. A secondary clearance face is discontiguous with the primary clearance face. A primary clearance angle formed by the primary clearance face is larger than a secondary clearance angle formed by the secondary clearance face.

In another non-limiting embodiment, a cutting insert comprises at least two discontiguous clearance faces.

In another non-limiting embodiment, a cutting insert comprises at least two discontiguous clearance faces, wherein the at least two discontiguous clearance faces comprise different clearance angles.

It is understood that the invention disclosed and described in this specification is not limited to the embodiments summarized in this Summary.

BRIEF DESCRIPTION OF THE DRAWINGS

Various features and characteristics of the non-limiting and non-exhaustive embodiments disclosed and described in this specification may be better understood by reference to the accompanying figures, in which:

FIGS. 6A, 6B, and 6C illustrate a single-sided round-shaped cutting insert comprising two discontiguous clearance faces having different clearance angles, in which FIG. 6B is a top view, FIG. 6A is a cross-sectional view of bisecting plane S-S in FIG. 6B, and FIG. 6C is a three-dimensional perspective view;

FIGS. 7A, 7B, and 7C illustrate a double-sided trigonal-shaped cutting insert comprising two discontiguous clearance faces having different clearance angles, in which FIG. 7B is a top view, FIG. 7A is a cross-sectional view of bisecting plane P-P in FIG. 7B, and FIG. 7C is a three-dimensional perspective view;

FIGS. 9A to 9D illustrate a single-sided substantially round-shaped cutting insert comprising discontiguous clearance faces having different clearance angles, in which FIG. 9A is a top view, FIG. 9B is a cross-sectional view of bisecting plane T-T in FIG. 9A, FIG. 9C is a three-dimensional perspective view, and FIG. 9D is a side view;

FIG. 11A is a side view and FIG. 11B is a three-dimensional perspective view of a cutting insert having contiguous clearance faces;

FIG. 12A is a side view and FIG. 12B is a three-dimensional perspective view of a cutting insert having discontiguous clearance faces;

Figure 1A:
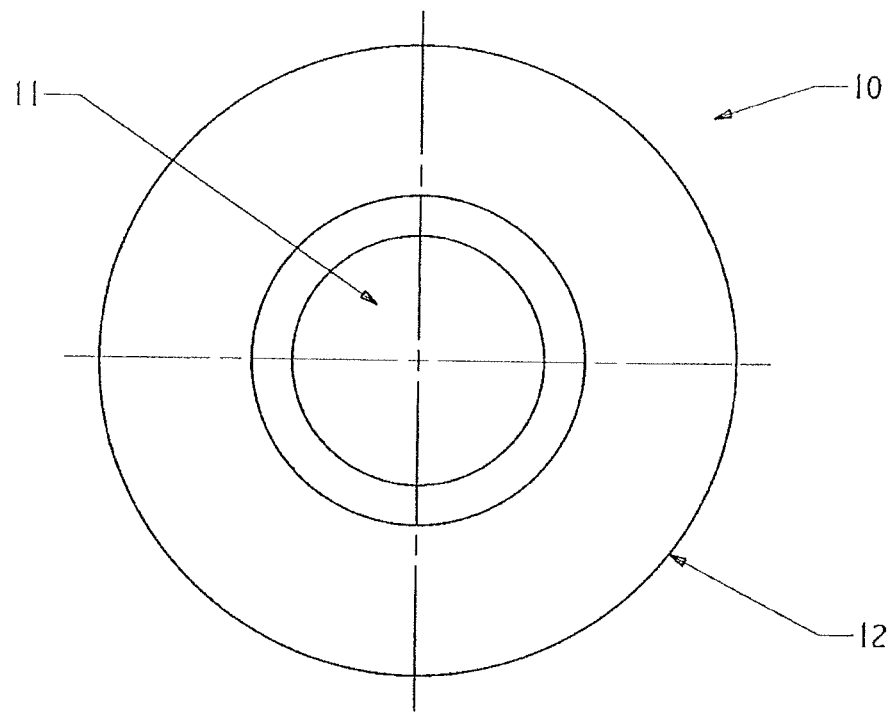
FIG. 1A is a top view and FIG. 1B is a side view of a single-sided round-shaped cutting insert comprising two contiguous clearance faces having different clearance angles.

The reader will appreciate the foregoing details, as well as others, upon considering the following detailed description of various non-limiting and non-exhaustive embodiments.

DESCRIPTION

Various embodiments are described and illustrated in this specification to provide an overall understanding of the structure, function, properties, and use of the disclosed cutting inserts and cutting tool systems. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicants reserve the right to amend the claims to affirmatively disclaim features or characteristics that are present in the prior art regardless of whether such features are explicitly described herein. Therefore, any such amendments comply with the requirements of 35 U.S.C. §112, first paragraph, and 35 U.S.C. §132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Various embodiments disclosed and described in this specification are directed, in part, to cutting inserts comprising at least two discontiguous clearance faces. As used herein, the term "discontiguous" refers to the separation of two surfaces by at least one intermediate surface. In contrast, "contiguous" surfaces directly adjoin along a curve, line, or point. For example, FIGS. 11A and 11B show a round-shaped cutting insert 150 comprising a first surface 151 that is contiguous with a second surface 155. The contiguous surfaces 151 and 155 directly adjoin along curve 152.

FIGS. 12A and 12B show a round-shaped cutting insert 160 comprising a first surface 161 that is discontiguous with a second surface 165. The discontiguous surfaces 161 and 165 are separated by a third surface 163. The first surface 161 is contiguous with the third surface 163, and the second surface 165 is contiguous with the third surface 163. The contiguous surfaces 161 and 163 directly adjoin along curve 162, and the contiguous surfaces 165 and 163 directly adjoin along curve 164.

Cutting inserts generally suffer from a limited service life in rotary machining applications, especially when used to cut difficult-to-machine materials such as, for example, titanium and titanium alloys. Cutting inserts having positive clearance face geometry may be employed in machining operations to improve the service life of the inserts. Cutting inserts having positive clearance face geometry comprise a clearance face (i.a, flank face) that forms a positive angle with the surface of a workpiece being machined by the cutting insert. Cutting inserts having neutral clearance face geometry comprise a flank face that forms a zero angle with the surface of a workpiece being machined by the cutting insert and, therefore, the flank face is in full contact with the workpiece surface.

Cutting inserts having positive rake face geometry comprise a rake face that forms a positive angle with an axis perpendicular to the surface of a workpiece at the intersection of the workpiece surface and the cutting edge of the cutting insert. Cutting inserts having negative rake face geometry comprise a rake face that forms a negative angle with an axis perpendicular to the surface of a workpiece at the intersection of the workpiece surface and the cutting edge of the cutting insert. Cutting inserts having neutral rake face geometry comprise a rake face that forms a zero angle with an axis perpendicular to the surface of a workpiece at the intersection of the workpiece surface and the cutting edge of the cutting insert.

Figure 13A:
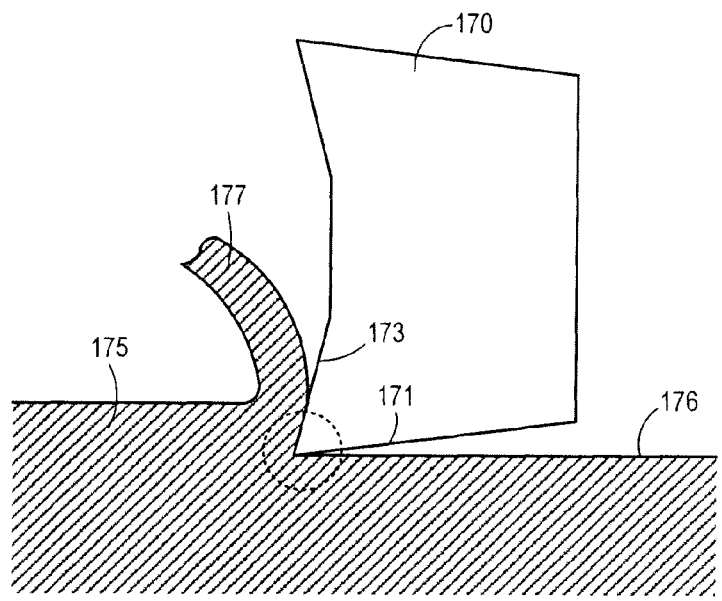
FIGS. 13A, 13B, and 13C are schematic diagrams providing a cross-sectional view and two detailed views, respectively, illustrating the rake angle formed between a rake surface of a cutting insert and a workpiece, and the clearance angle formed between a clearance surface of a cutting insert and a workpiece.
Figure 13B:
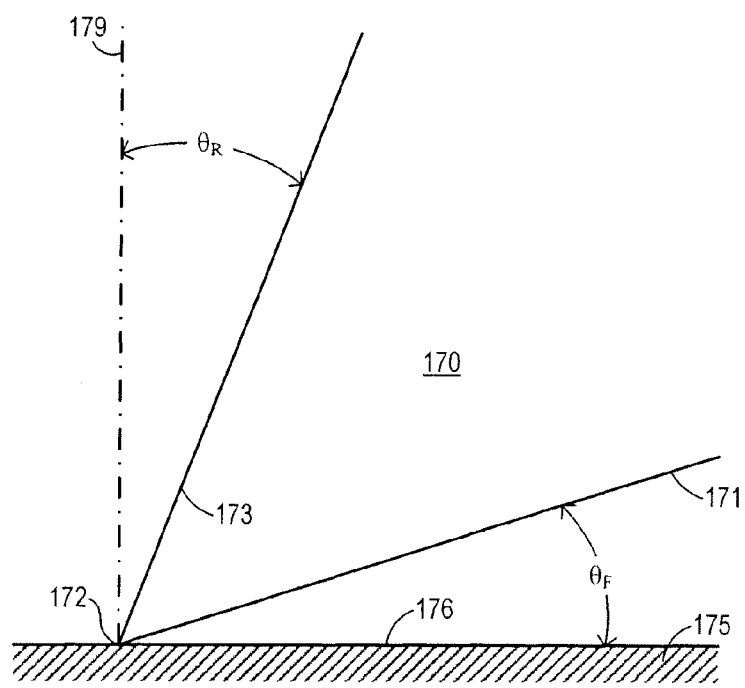
Figure 13C:
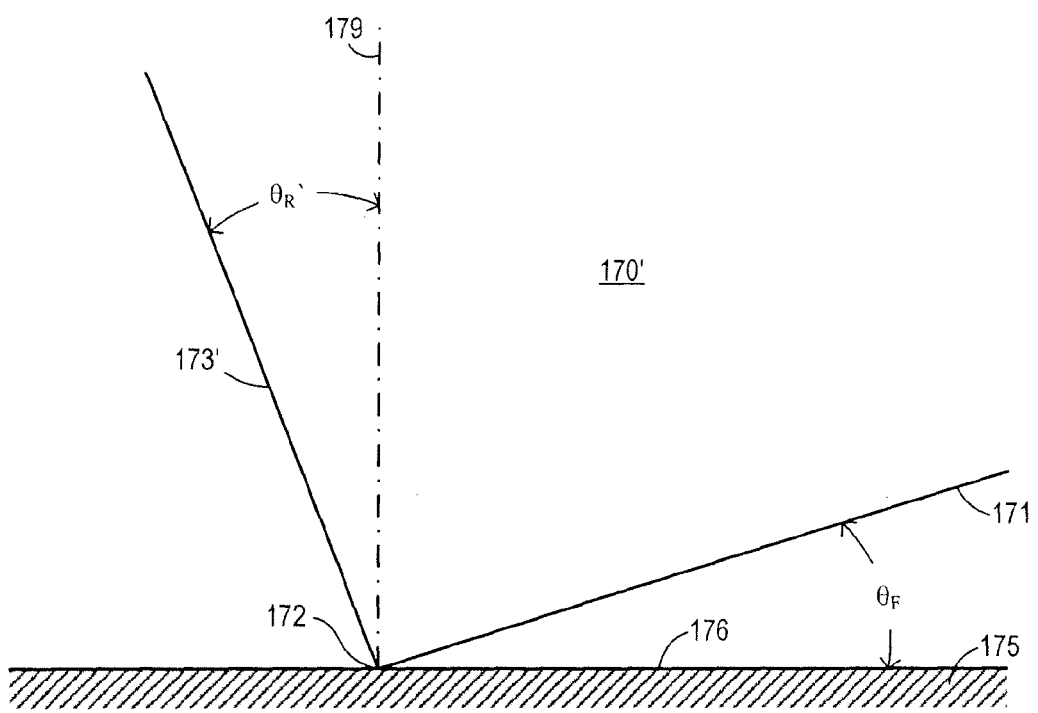
Figure 14A:
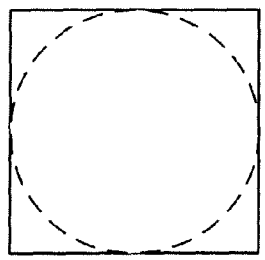
FIGS. 14A to 14F are schematic diagrams illustrating the inscribed circles of square-shaped, rectangle-shaped, parallelogram-shaped, trigonal-shaped, pentagon-shaped, and hexagon-shaped cutting inserts, respectively.
Figure 14B:
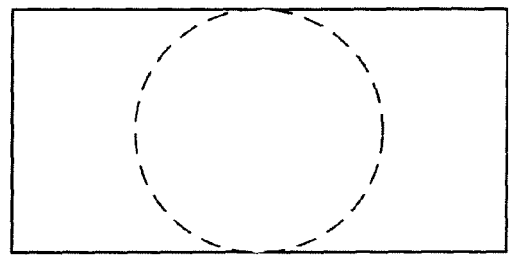
Figure 14C:
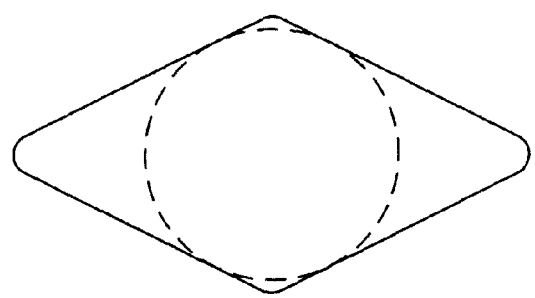
Figure 14D:
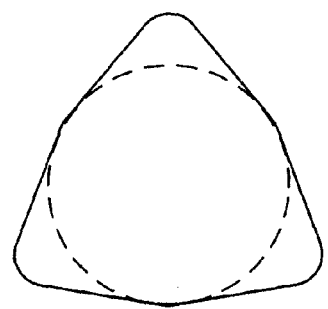
Figure 14E:
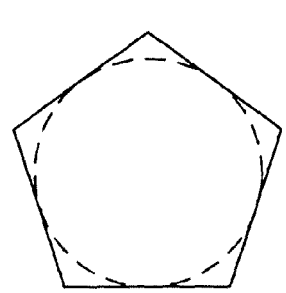
Figure 14F:
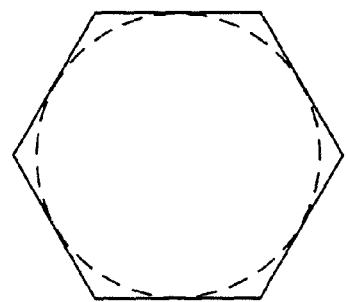

FIGS. 13A and 13B show a cutting insert 170 comprising a rake face 173 and a clearance face 171. As shown in FIG. 13A, the cutting insert 170 is engaging a workpiece 175, machining the surface 176 and producing chips 177 of the workpiece material being cut. As shown in FIG. 13B, the clearance face 171 forms a positive clearance angle $\theta_F$ with the surface 176 of the workpiece 175. As the clearance angle $\theta_F$ approaches zero, the clearance face approaches full contact with the surface 176 of the workpiece 175. Axis 179 shown in FIG. 13B is defined as an axis that is perpendicular to the surface 176 of the workpiece 175 at the point of contact between the cutting edge 172 of the cutting insert 170 and the surface 176 of the workpiece 175. The rake face 173 forms a positive rake angle $\theta_R$ with the axis 179. FIG. 13C shows a cutting insert 170' comprising a rake face 173' that forms a negative rake angle $\theta_R'$ with the axis 179. Cutting inserts having neutral rake face geometry comprise a rake face that forms a zero rake angle with the axis 179 (not shown).

As used herein, the term "positive clearance face geometry" refers to cutting inserts comprising a clearance face having a positive clearance angle as shown in FIG. 13B. As used herein, the term "positive rake face geometry" refers to cutting inserts comprising a rake face having a positive rake angle as shown in FIG. 13B. As used herein, the term "negative rake face geometry" refers to cutting inserts comprising a rake face having a negative rake angle as shown in FIG. 13C. As used herein, the term "neutral rake face geometry" refers to cutting inserts comprising a rake face having a zero rake angle. As used herein, the term "positive cutting geometry" refers to cutting inserts having positive clearance face geometry and positive rake face geometry or neutral rake face geometry.

Cutting inserts having positive cutting geometry including one or more positive or neutral rake angles on the top (rake) face and one or more positive clearance angles on the cutting clearance (flank) face provide a sharp cutting edge that efficiently cuts into workpiece material and significantly reduces the cutting forces. Cutting inserts having positive cutting geometry require lower cutting forces to produce a cut and, consequently, reduced power consumption, resulting in more energy efficient rotary machining operations.

Positive cutting geometry, including positive or neutral rake angles and positive clearance angles, may be an important feature in rotary machining applications in which cutting tool systems are used to machine difficult-to-machine materials such as, for example, titanium and titanium alloys. Such difficult-to-machine materials may have mechanical properties, such as relatively low elastic modulus, which can cause spring back as a cutting tool shears through the material. This tends to cause excessive tool wear and can severely limit tool service life. Cutting inserts having positive cutting geometry decease tool wear and increase tool service life because of the lower cutting forces required to effectively cut material with cutting tools comprising the cutting inserts.

Under the American National Standards Institute (ANSI) and the International Organization for Standardization (ISO) standards, cutting inserts for rotary machining applications are defined by dimensional features such as inscribed diameter, thickness, and nose corner radius, and by geometrical features such as peripheral shape, clearance angle, and fastener/mounting hole configuration. Generally, cutting inserts comprising different inscribed circle diameters require differently sized and/or shaped insert pockets and, therefore, different tool holders. As used herein, the term "inscribed circle diameter" refers to the diameter of the largest circle that fits completely inside the peripheral boundary of a cutting insert. For example, FIGS. 14A to 14F are schematic diagrams illustrating the inscribed circles of square-shaped, rectangle-shaped, parallelogram-shaped, trigonal-shaped, pentagon-shaped, and hexagon-shaped cutting inserts, respectively. The inscribed circle diameter of a round-shaped cutting insert is equal to the diameter of the cutting edge at the periphery of the insert.

Further, cutting inserts comprising the same inscribed circle diameter but different cutting clearance angles generally require differently sized and/or shaped insert pockets and, therefore, different tool holders. The non-limiting embodiments described in this specification address these issues by providing cutting inserts comprising different clearance angles and/or different inscribed circle diameters, but that fit into a common insert pocket. Therefore, in accordance with the embodiments described in this specification, multiple differently sized and/or shaped cutting inserts may be used in a single tool holder.

Various non-limiting embodiments include a cutting insert configured for attachment to a cutting tool holder for machining applications (e.g., milling turning, drilling, threading, thread milling, boring, cut-off, and the like). The cutting insert may comprise a top face, a bottom face, and at least two clearance faces. The at least two clearance faces may connect the top face to the bottom face. A primary clearance face is contiguous with the top face and forms a cutting edge at the intersection of the primary clearance face and the top face. The primary clearance face and a secondary clearance face are discontiguous. The primary clearance face comprises a primary clearance angle, and the secondary clearance face comprises a secondary clearance angle. The primary clearance angle may be different than the secondary clearance angle. In various non-limiting embodiments, the primary clearance angle may be larger than the secondary clearance angle.

The cutting inserts described in this specification may comprise different peripheral shapes such as, for example, round (i.e., circular), triangular, trigonal, rectangular, square, parallelogram-shaped, diamond-shaped, rhombus-shaped, or rhomboid-shaped, pentagonal, hexagonal, octagonal, and asymmetric peripheral shapes. The cutting inserts described in this specification may be single-sided or double-sided. The cutting inserts described in this specification may indexable.

Various non-limiting embodiments include a double-sided cutting insert configured for attachment to a cutting tool holder for machining applications (e.g., milling turning, drilling, threading, thread milling, boring, cut-off, and the like). The cutting insert may comprise a top face, a bottom face, two primary clearance faces, and at least one secondary clearance face. A first primary clearance face is contiguous with the top face and forms a cutting edge at the intersection of the first primary clearance face and the top face. A second primary clearance face is contiguous with the bottom face and forms a cutting edge at the intersection of the second primary clearance face and the bottom face. The at least one secondary clearance face is discontiguous with at least one of the first and second primary clearance faces. The first and second primary clearance faces comprise primary clearance angles, and the at least one secondary clearance face comprises a secondary clearance angle. A primary clearance angle may be different than a secondary clearance angle. In various non-limiting embodiments, a primary clearance angle may be larger than a secondary clearance angle. In various non-limiting embodiments, the double-sided cutting insert is symmetric through a middle plane located between the top face and the bottom face, with or without angular rotation about a central axis co-linear with a mounting hole through and between the top face and the bottom face.

Figure 1B:
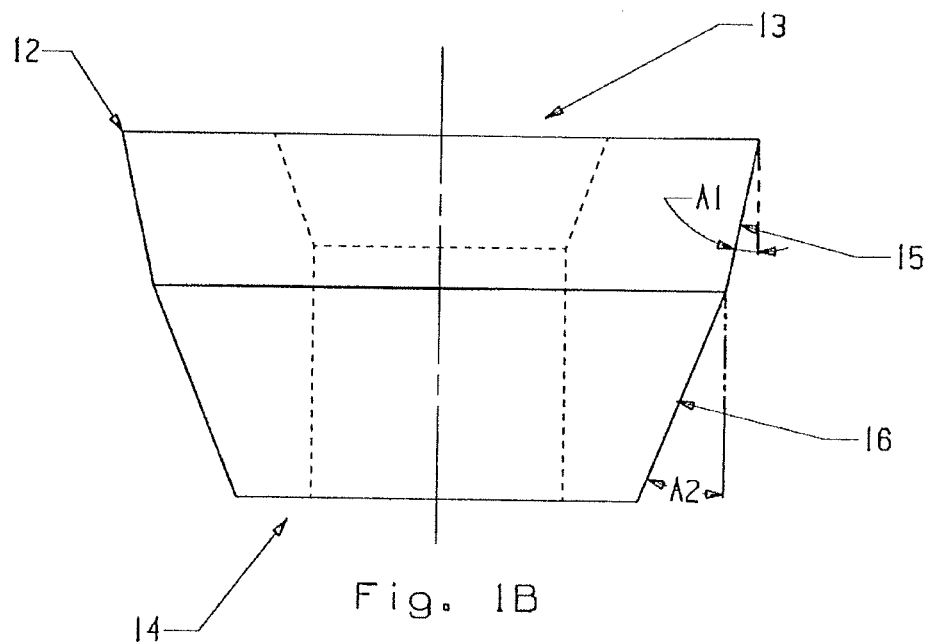

FIGS. 1A and 1B show a single-sided cutting insert 10 comprising a round peripheral shape. The cutting insert 10 comprises a top face 13, a bottom face 14, and two clearance faces 15 and 16 connecting the top face 13 and the bottom face 14 at the periphery of the cutting insert 10. A center mounting hole 11 is positioned through and between the top face 13 and the bottom face 14 and is configured to secure the cutting insert 10 to a cutting tool holder (not shown). The primary clearance face 15 is contiguous with the top face 13 and forms a cutting edge 12 at the intersection of the primary clearance face 15 and the top face 13. The primary clearance face 15 and the secondary clearance face 16 are contiguous. The primary clearance face 15 forms a primary clearance angle A1, and the secondary clearance face 16 forms a secondary clearance angle A2. The primary clearance angle A1 is smaller than the secondary clearance angle A2.

Figure 2A:
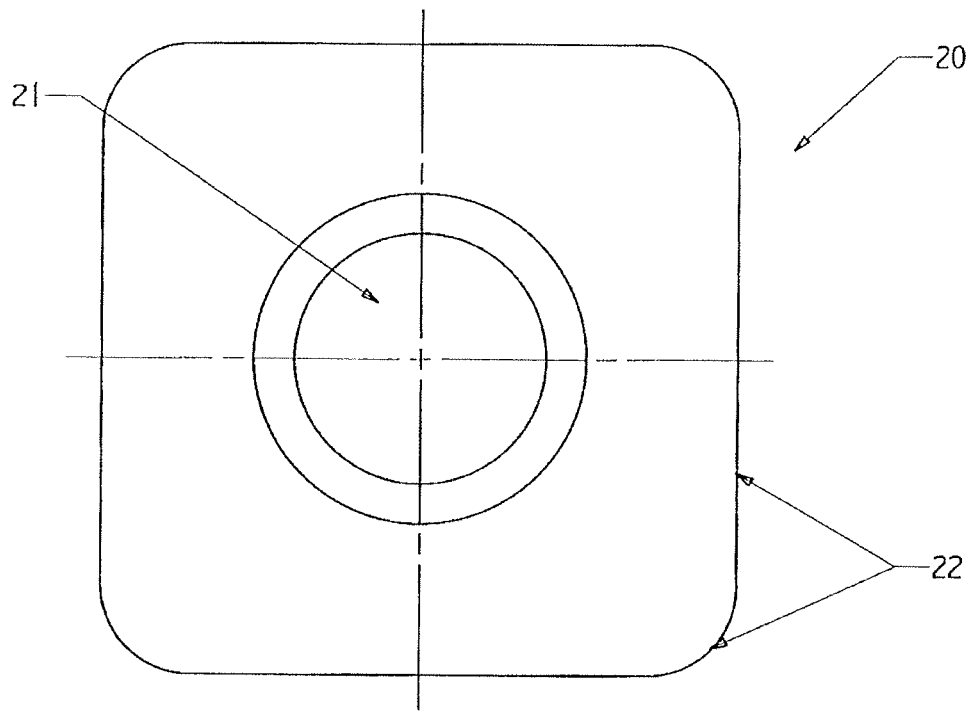
FIG. 2A is a top view and FIG. 2B is a side view of a single-sided square-shaped cutting insert comprising two contiguous clearance faces having different clearance angles.
Figure 2B:
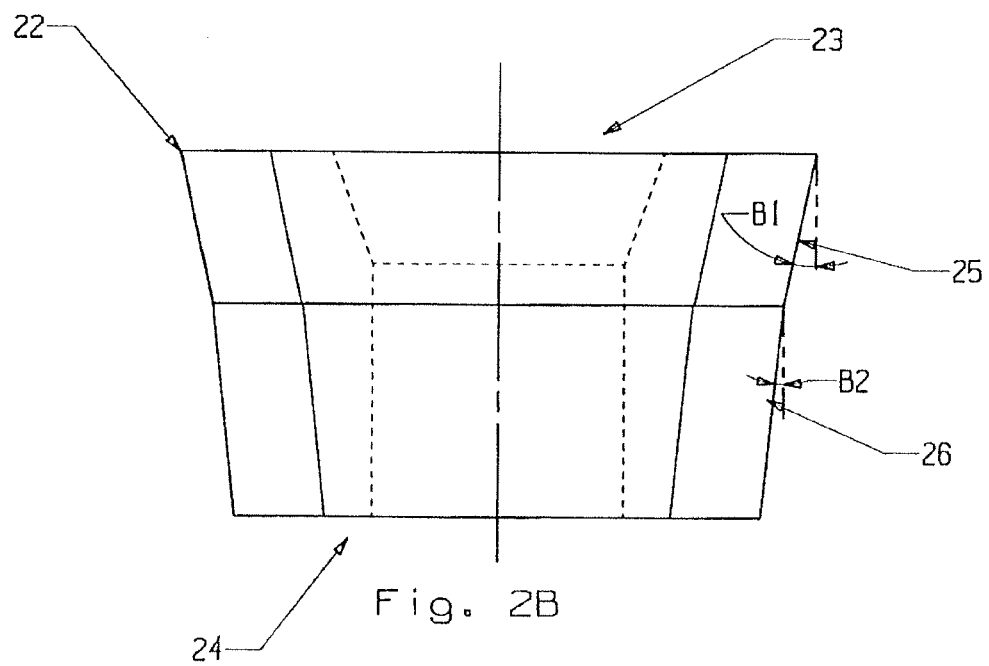

FIGS. 2A and 2B show a single-sided cutting insert 20 comprising a square peripheral shape. The cutting insert 20 comprises a top face 23, a bottom face 24, and two clearance faces 25 and 26 connecting the top face 23 and the bottom face 24 at the periphery of the cutting insert 20. A center mounting hole 21 is positioned through and between the top face 23 and the bottom face 24 and is configured to secure the cutting insert 20 to a cutting tool holder (not shown). The primary clearance face 25 is contiguous with the top face 23 and forms a cutting edge 22 at the intersection of the primary clearance face 25 and the top face 23. The primary clearance face 25 and the secondary clearance face 26 are contiguous. The primary clearance face 25 forms a primary clearance angle B1, and the secondary clearance face 26 forms a secondary clearance angle B2. The primary clearance angle B1 is larger than the secondary clearance angle B2.

Figure 3A:
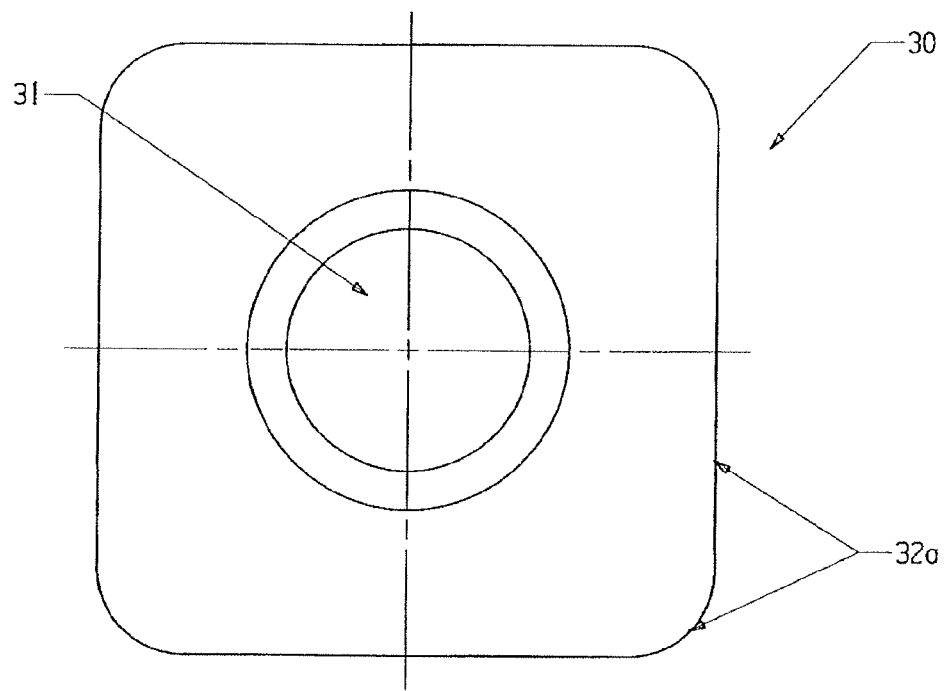
FIG. 3A is a top view and FIG. 3B is a side view of a double-sided square-shaped cutting insert comprising two contiguous clearance faces on each side of the cutting insert, the two contiguous clearance faces forming different clearance angles.
Figure 3B:
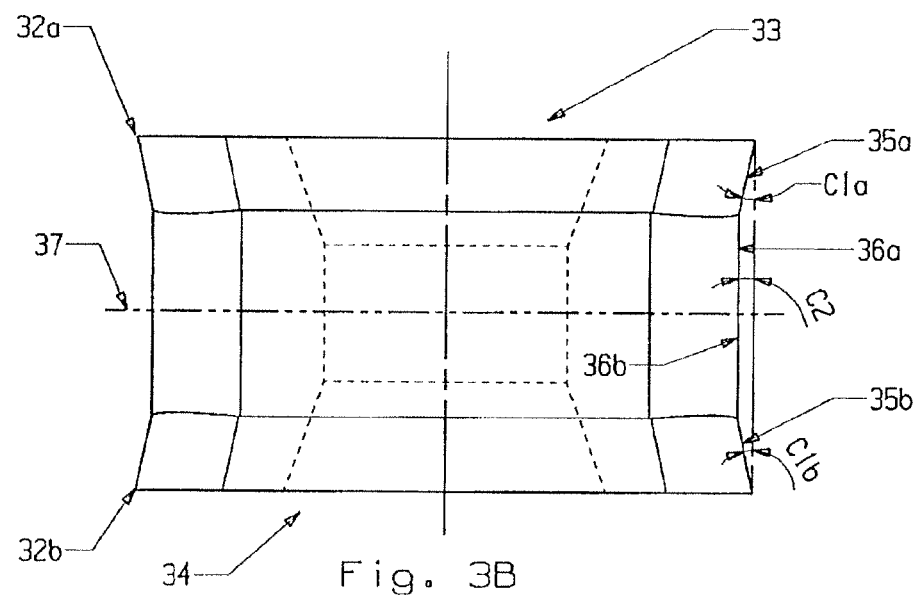

FIGS. 3A and 3B show a double-sided cutting insert 30 comprising a square peripheral shape. The cutting insert 30 comprises a top face 33, a bottom face 34, a first primary clearance face 35a, a second primary clearance face 35b, a first secondary clearance face 36a, and a second secondary clearance face 36b. The clearance faces 35a, 36a, 36b, and 35b connect the top face 33 and the bottom face 34 at the periphery of the cutting insert 30. A center mounting hole 31 is positioned through and between the top face 33 and the bottom face 34 and is configured to secure the cutting insert 20 to a cutting tool holder (not shown). The first primary clearance face 35a is contiguous with the top face 33 and forms a cutting edge 32a at the intersection of the first primary clearance face 35a and the top face 33. The second primary clearance face 35b is contiguous with the bottom face 34 and forms a cutting edge 32b at the intersection of the second primary clearance face 35b and the bottom face 34.

The first primary clearance face 35a and the first secondary clearance face 36a are contiguous. The second primary clearance face 35b and the second secondary clearance face 36b are contiguous and may comprise a single surface. The first secondary clearance face 36a and the second secondary clearance face 36b are contiguous. The first primary clearance face 35a forms a first primary clearance angle C1a. The second primary clearance face 35b forms a second primary clearance angle C1b. The first secondary clearance face 36a and the second secondary clearance face 36b form a secondary clearance angle C2. The primary clearance angles C1a and C1b are larger than the secondary clearance angle C2, which is equal to zero in the non-limiting embodiment shown in FIG. 3B.

The double-sided cutting insert 30 shown in FIGS. 3A and 3B is symmetric through middle plane 37. In various non-limiting embodiments, the top face 33 and the bottom face 34 may be identical and possess mirror symmetry through the middle plane 37. The top portion of the cutting insert 30 located between the top face 33 and the middle plane 37 includes the first primary clearance face 35a and the first secondary clearance face 36a. The bottom portion of the cutting insert 30 located between the bottom face 34 and the middle plane 37 includes the second primary clearance face 35b and the second secondary clearance face 36b. In symmetric embodiments, the primary clearance angles C1a and C1b are equal, but in asymmetric embodiments (not shown), the primary clearance angles C1a and C1b may be different.

Figure 4A:
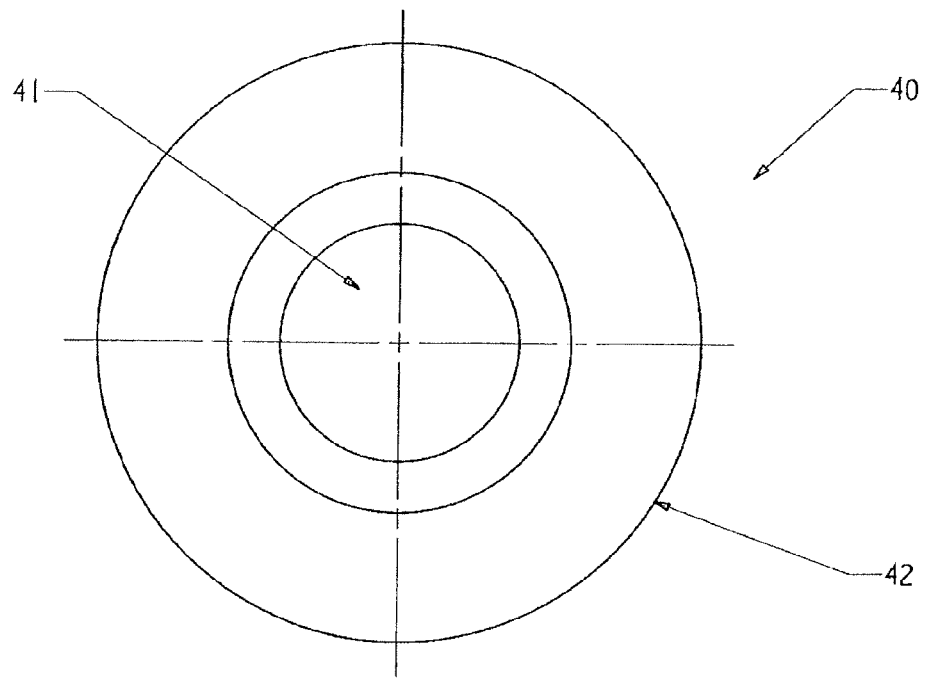
FIG. 4A is a top view and FIG. 4B is a side view of a single-sided round-shaped cutting insert comprising two discontiguous clearance faces having different clearance angles.
Figure 4B:
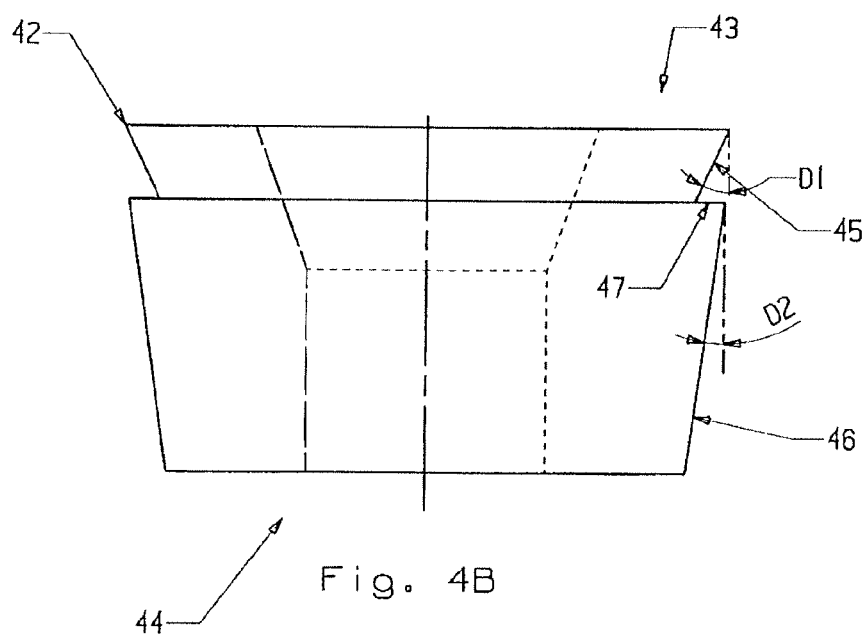

FIGS. 4A and 4B show a single-sided cutting insert 40 comprising a round peripheral shape. The cutting insert 40 comprises a top face 43, a bottom face 44, and two clearance faces 45 and 46 connecting the top face 43 and the bottom face 44 at the periphery of the cutting insert 40. A center mounting hole 41 is positioned through and between the top face 43 and the bottom face 44 and is configured to secure the cutting insert 40 to a cutting tool holder (not shown). The primary clearance face 45 is contiguous with the top face 43 and forms a cutting edge 42 at the intersection of the primary clearance face 45 and the top face 43. The primary clearance face 45 and the secondary clearance face 46 are discontiguous. The primary clearance face 45 and the secondary clearance face 46 are separated by a bridge surface 47. The bridge surface 47 is contiguous with the primary clearance face 45 and the secondary clearance face 46, respectively, and provides the separating surface between the discontiguous clearance faces. The primary clearance face 45 forms a primary clearance angle D1, and the secondary clearance face 46 forms a secondary clearance angle D2. The primary clearance angle D1 is larger than the secondary clearance angle D2.

Figure 5A:
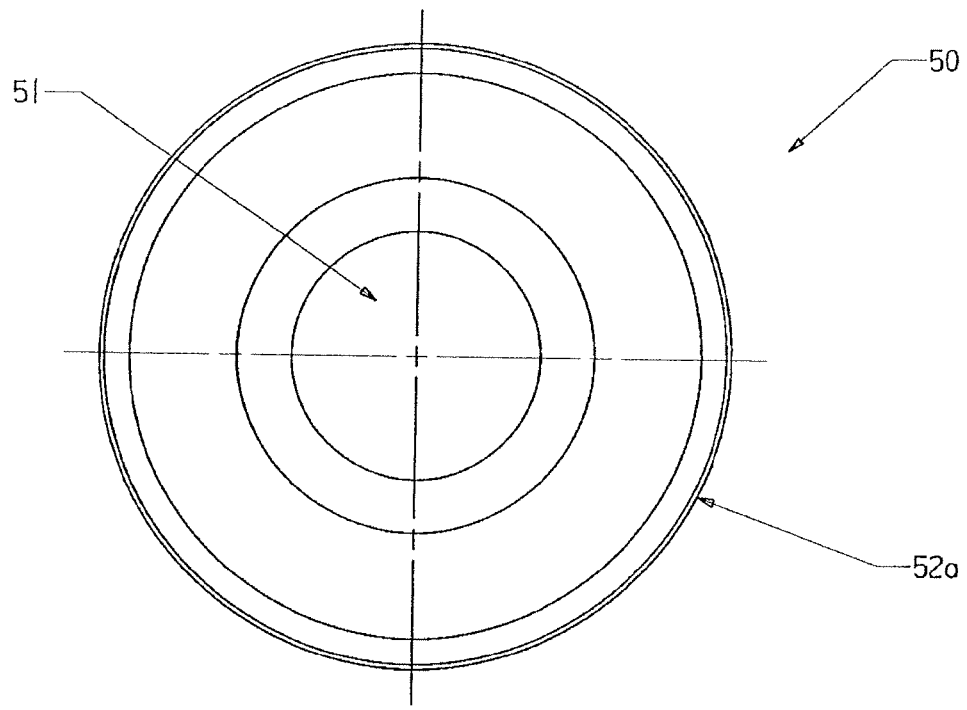
FIG. 5A is a top view and FIG. 5B is a side view of a double-sided round-shaped indexable cutting insert comprising two discontiguous clearance faces on each side of the cutting insert, the two discontiguous clearance faces forming different clearance angles.
Figure 5B:
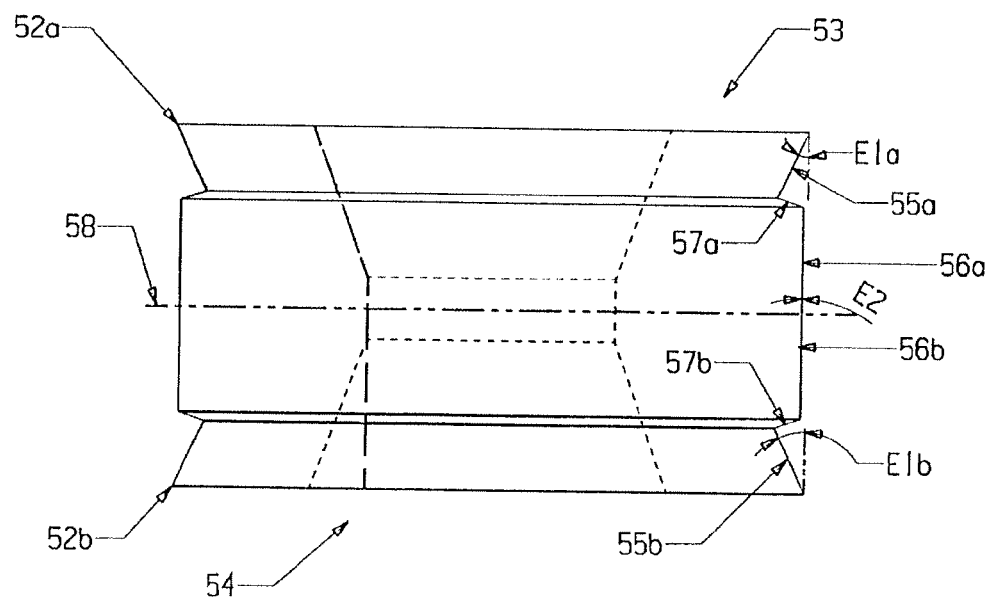

FIGS. 5A and 5B show a double-sided cutting insert 50 comprising a round peripheral shape. The cutting insert 50 comprises a top face 53, a bottom face 54, a first primary clearance face 55a, a second primary clearance face 55b, a first secondary clearance face 56a, and a second secondary clearance face 56b. The clearance faces 55a, 56a, 56b, and 55b connect the top face 53 and the bottom face 54 at the periphery of the cutting insert 50. A center mounting hole 51 is positioned through and between the top face 53 and the bottom face 54 and is configured to secure the cutting insert 50 to a cutting tool holder (not shown). The first primary clearance face 55a is contiguous with the top face 53 and forms a cutting edge 52a at the intersection of the first primary clearance face 55a and the top face 53. The second primary clearance face 55b is contiguous with the bottom face 54 and forms a cutting edge 52b at the intersection of the second primary clearance face 55b and the bottom face 54.

The first primary clearance face 55a and the first secondary clearance face 56a are discontiguous. The first primary clearance face 55a and the first secondary clearance face 56a are separated by a first bridge surface 57a. The first bridge surface 57a is contiguous with the first primary clearance face 55a and the first secondary clearance face 56a, respectively, and provides the separating surface between the discontiguous first clearance faces. The second primary clearance face 55b and the second secondary clearance face 56b are discontiguous. The second primary clearance face 55b and the second secondary clearance face 56b are separated by a second bridge surface 57b. The second bridge surface 57b is contiguous with the second primary clearance face 55b and the second secondary clearance face 56b, respectively, and provides the separating surface between the discontiguous second clearance faces.

The first secondary clearance face 56a and the second secondary clearance face 56b are contiguous and may comprise a single surface. The first primary clearance face 55a forms a first primary clearance angle E1a. The second primary clearance face 55b forms a second primary clearance angle E1b. The first secondary clearance face 56a and the second secondary clearance face 56b form a secondary clearance angle E2. The primary clearance angles E1a and E1b are larger than the secondary clearance angle E2, which is equal to zero in the non-limiting embodiment shown in FIG. 5B.

The double-sided cutting insert 50 shown in FIGS. 5A and 5B is symmetric through middle plane 58. In various non-limiting embodiments, the top face 53 and the bottom face 54 may be identical and possess mirror symmetry through the middle plane 58. The top portion of the cutting insert 50 located between the top face 53 and the middle plane 58 includes the first primary clearance face 55a, the first bridge surface 57a, and the first secondary clearance face 56a. The bottom portion of the cutting insert 50 located between the bottom face 54 and the middle plane 58 includes the second primary clearance face 55b, the second bridge surface 57b, and the second secondary clearance face 56b. In symmetric embodiments, the primary clearance angles E1a and E1b are equal, but in asymmetric embodiments (not shown), the primary clearance angles E1a and E1b may be different.

FIGS. 6A, 6B, and 6C show a single-sided cutting insert 60 comprising a round peripheral shape. The cutting insert 60 comprises a top face 63, a bottom face 64, and two clearance faces 65 and 66. A center mounting hole 61 is positioned through and between the top face 63 and the bottom face 64 and is configured to secure the cutting insert 60 to a cutting tool holder (not shown). The primary clearance face 65 is contiguous with the top face 63 and forms a cutting edge 62 at the intersection of the primary clearance face 65 and the top face 63. The primary clearance face 65 and the secondary clearance face 66 are discontiguous. The primary clearance face 65 and the secondary clearance face 66 are separated by a bridge surface 67. The bridge surface 67 is contiguous with the primary clearance face 65 and the secondary clearance face 66, respectively, and provides the separating surface between the discontiguous clearance faces. The primary clearance face 65 forms a primary clearance angle F1, and the secondary clearance face 66 forms a secondary clearance angle F2. The primary clearance angle F1 is larger than the secondary clearance angle F2. The top face 63 comprises chip breakers 69 and has a positive rake angle.

As used herein, the term "chip breaker" refers to a built-in geometric feature on the rake surface of a cutting insert that functions to promote chip flow/chip breaking during machining operations. Chip breaker geometry is characterized by various geometric parameters such as, for example, groove depth, rake angle, backwall land, and groove width. Various chip breaker geometries are described in U.S. Pat. Nos. 5,145,295; 6,193,446; and 7,905,689, which are incorporated by reference into this specification.

Figure 7A:
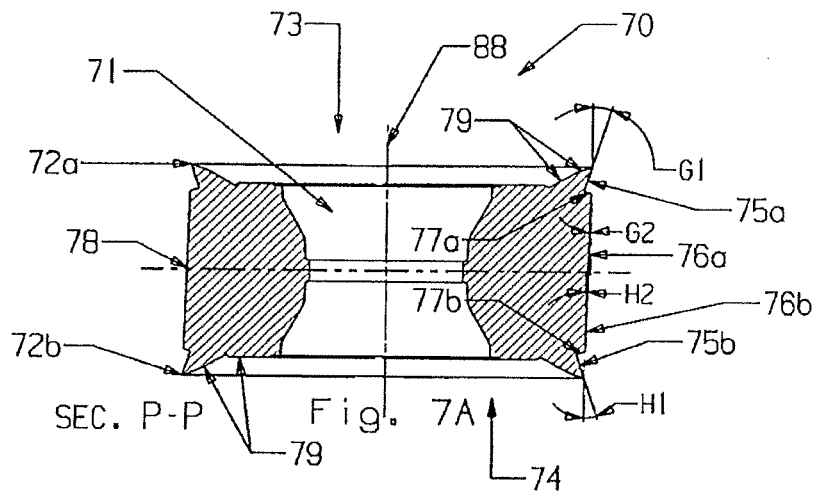
Figure 7B:
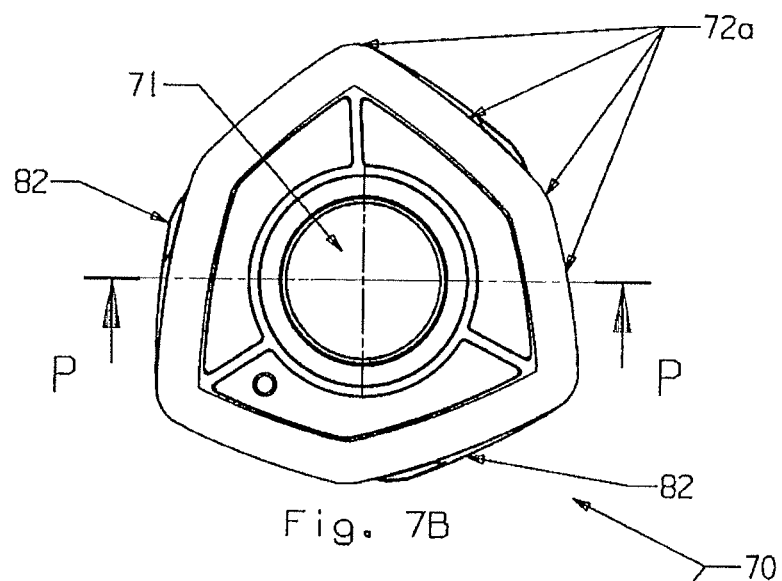
Figure 7C:
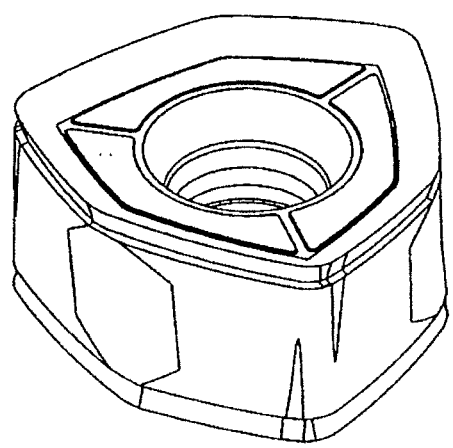

FIGS. 7A, 7B, and 7C show a double-sided cutting insert 70 comprising a trigonal peripheral shape. The cutting insert 70 comprises a top face 73, a bottom face 74, a first primary clearance face 75a, a second primary clearance face 75b, a first secondary clearance face 76a, and a second secondary clearance faces 75a, 76a, 76b, and 75b connect the top face 73 and the bottom face 74 at the periphery of the cutting insert 70. A center mounting hole 71 is positioned through and between the top face 73 and the bottom face 74 and is configured to secure the cutting insert 70 to a cutting tool holder (not shown). The first primary clearance face 75a is contiguous with the top face 73 and forms a cutting edge 72a at the intersection of the first primary clearance face 75a and the top face 73. The second primary clearance face 75b is contiguous with the bottom face 74 and forms a cutting edge 72b at the intersection of the second primary clearance face 75b and the bottom face 74.

The first primary clearance face 75a and the first secondary clearance face 76a are discontiguous. The first primary clearance face 75a and the first secondary clearance face 76a are separated by a first bridge surface 77a. The first bridge surface 77a is contiguous with the first primary clearance face 75a and the first secondary clearance face 76a, respectively, and provides the separating surface between the discontiguous first clearance faces. The second primary clearance face 75b and the second secondary clearance face 76b are discontiguous. The second primary clearance face 75b and the second secondary clearance face 76b are separated by a second bridge surface 77b. The second bridge surface 77b is contiguous with the second primary clearance face 75b and the second secondary clearance face 76b, respectively, and provides the separating surface between the discontiguous second clearance faces.

The first secondary clearance face 76a and the second secondary clearance face 76b are contiguous. The first primary clearance face 75a forms a first primary clearance angle G1. The second primary clearance face 75b forms a second primary clearance angle H1. The first secondary clearance face 76a forms a first secondary clearance angle G2. The second secondary clearance face 76b forms a second secondary clearance angle H2. The primary clearance angle G1 is larger than the secondary clearance angle G2. The primary clearance angle H1 is larger than the secondary clearance angle H2.

The double-sided cutting insert 70 shown in FIGS. 7A, 7B, and 7C is symmetric through middle plane 78 with a rotational off-set about the center axis 88 of the center mounting hole 71. In various non-limiting embodiments, the top face 73 and the bottom face 74 may comprise identical peripheral shapes and surface contours, wherein the respective faces are mirror symmetric through the middle plane 78 and rotated relative to each other by an angle about the center axis 88 of the center mounting hole 71. This rotational off-set is shown in FIG. 7B by non-overlapping cutting edge portions 82.

The top portion of the cutting insert 70 located between the top face 73 and the middle plane 78 includes the first primary clearance face 75a, the first bridge surface 77a, and the first secondary clearance face 76a. The bottom portion of the cutting insert 70 located between the bottom face 74 and the middle plane 78 includes the second primary clearance face 75b, the second bridge surface 77b, and the second secondary clearance face 76b.

In symmetric embodiments, the primary clearance angles G1 and H1 are equal, but in asymmetric embodiments (not shown), the primary clearance angles G1 and H1 may be different. Likewise, in symmetric embodiments, the secondary clearance angles G2 and H2 are equal, but in asymmetric embodiments (not shown), the primary clearance angles G2 and H2 may be different. The top face 73 and the bottom face 74 comprise chip breakers 79 and have a positive rake angle.

Figure 8A:
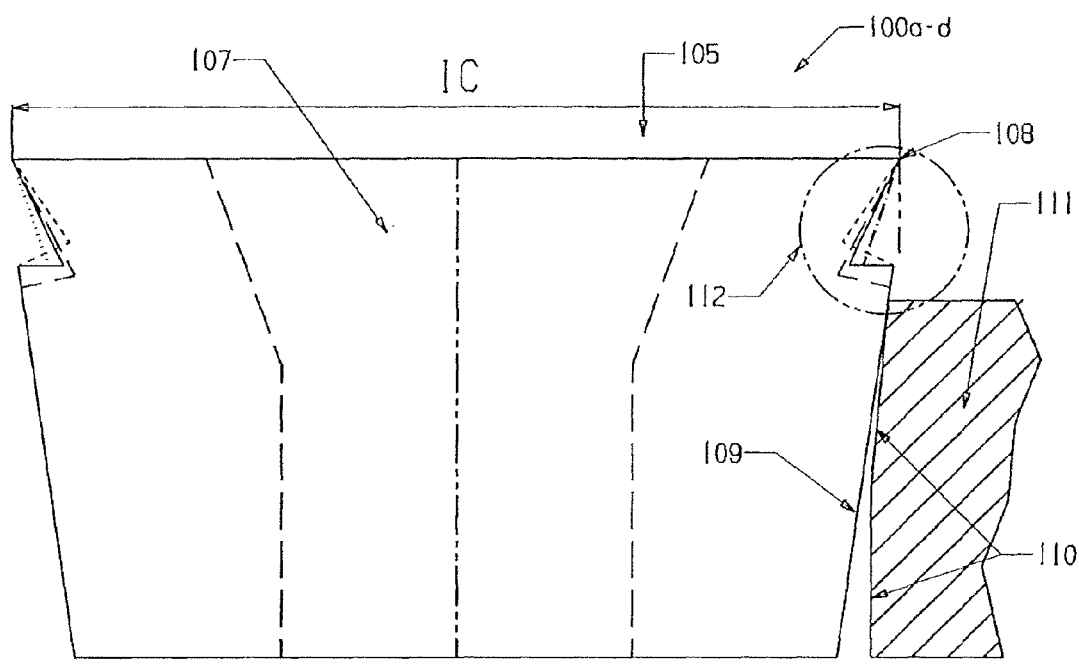
FIGS. 8A and 8B are schematic diagrams providing a side view and a detailed view, respectively, of four cutting inserts, each cutting insert comprising two discontiguous clearance faces and the four cutting inserts having different primary clearance angles and the same inscribed circle diameter (IC)
Figure 8B:
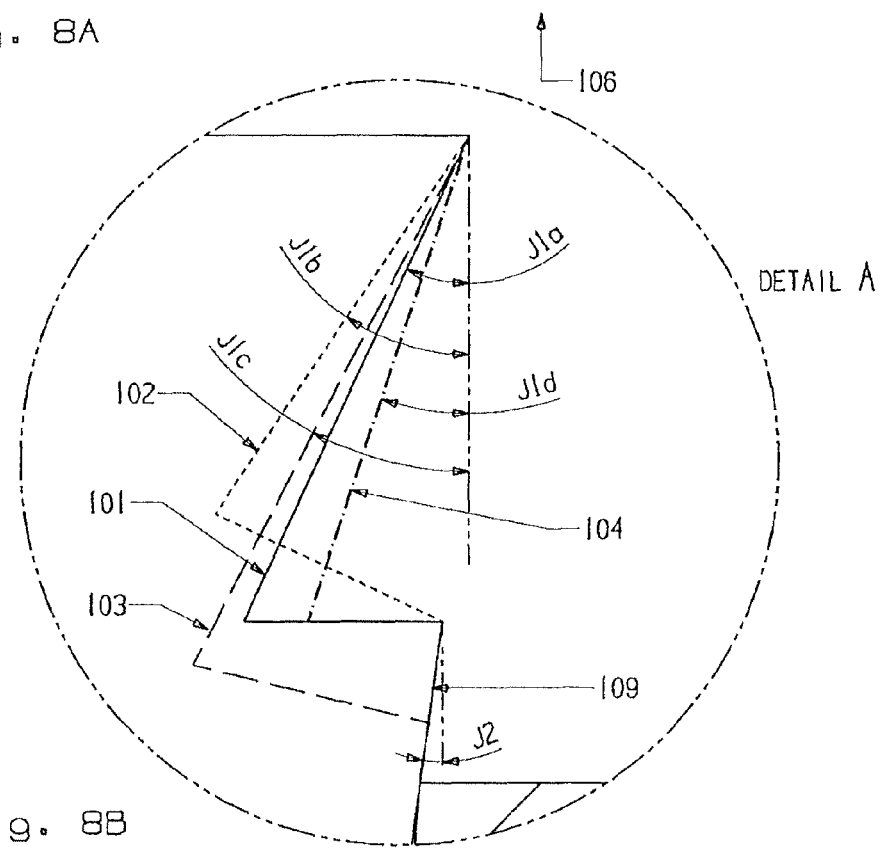

FIGS. 8A and 8B schematically illustrate four cutting inserts 100a, 100b, 100c, and 100d (100a-d) having the same inscribed circle diameter (IC) but different primary clearance faces and different primary clearance angles. The cutting inserts 100a-d may comprise any peripheral shape such as, for example, round, triangular, trigonal, rectangular, square, parallelogram-shaped, pentagonal, hexagonal, octagonal, and asymmetric peripheral shapes. The cutting inserts 100a-d comprise a top face 105, a bottom face 106, and two clearance faces: a secondary clearance face 109 and primary clearance faces 101, 102, 103, and 104, respectively. A center mounting hole 107 is positioned through and between the top face 105 and the bottom face 106 and is configured to secure the cutting inserts 100a-d to a cutting tool holder (not shown).

The primary clearance faces 101, 102, 103, and 104 are contiguous with the top face 105 and form a cutting edge 108 at the intersection of the top face 105 and the primary clearance face 101, 102, 103, or 104, respectively. The secondary clearance face 109 is discontiguous with the primary clearance face 101, 102, 103, or 104. The secondary clearance face 109 and the primary clearance face 101, 102, 103, or 104 are separated by a bridge surface. The bridge surface is contiguous with the primary clearance face 101, 102, 103, or 104 and the secondary clearance face 109, and provides the separating surface between the discontiguous clearance faces. The primary clearance faces 101, 102, 103, and 104 form different primary clearance angles J1a, J1b, J1c, and J1d, respectively. The secondary clearance face 109 forms a secondary clearance angle J2. The primary clearance angles J1a-d are larger than the secondary clearance angle J2.

FIG. 8A shows a portion of an insert pocket 111 of a cutting tool holder (now shown) comprising a pocket wall 110 engaging and supporting the secondary clearance face 109, which is the same for all four embodiments comprising different primary clearance faces and different primary clearance angles. An advantage of the non-limiting embodiment illustrated in FIGS. 8A and 8B is that a plurality of different cutting inserts comprising different primary clearance faces and/or different primary clearance angles, and comprising the same inscribed circle diameter and the same secondary clearance angle, may fit into a common insert pocket and, therefore, a single tool holder. This reduces the numbers of corresponding tool holders required to support different cutting inserts, which may provide significant cost reduction for both cutting tool manufacturers and cutting tool users.

FIGS. 9A to 9D show a single-sided cutting insert 120 comprising a substantially round peripheral shape. The cutting insert 120 comprises a top face 123, a bottom face 124, and clearance faces 125 and 126. A center mounting hole 121 is positioned through and between the top face 123 and the bottom face 124 and is configured to secure the cutting insert 120 to a cutting tool holder (not shown). The primary clearance faces 125 are contiguous with the top face 123 and form a cutting edge 122 at the intersection of the primary clearance faces 125 and the top face 123. The primary clearance faces 125 and the secondary clearance face 126 are discontiguous. The primary clearance faces 125 and the secondary clearance face 126 are separated by bridge surfaces 127.

Figure 9A:
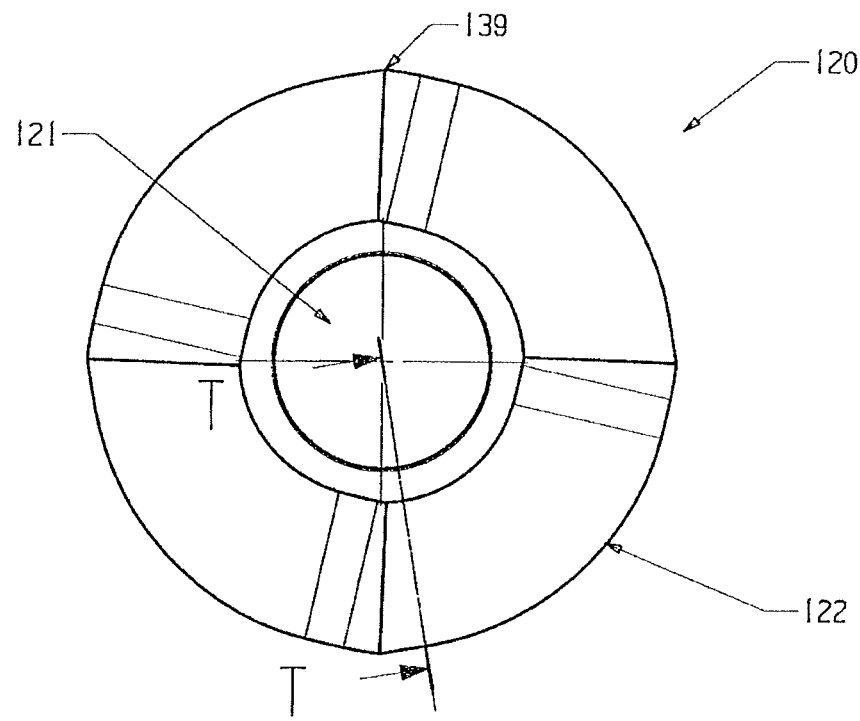
Figure 9B:
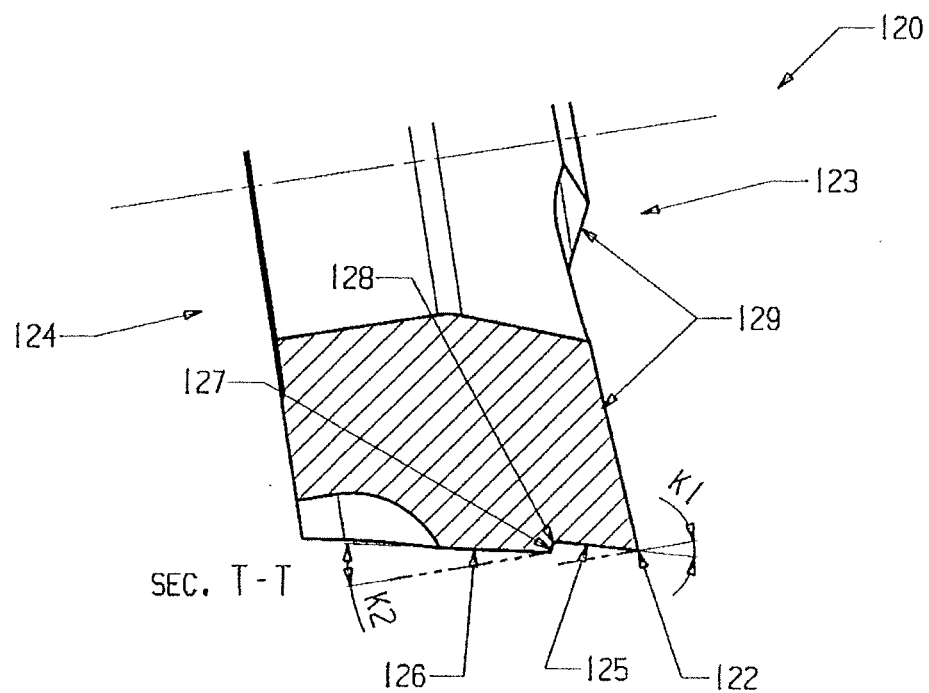

The bridge surfaces 127 are contiguous with the primary clearance faces 125 and the secondary clearance face 126, respectively, and provide the separating surfaces between the discontiguous clearance faces. As shown in FIG. 9B, the bridge surfaces 127 are contiguous with the primary clearance faces 125 through arcuate surface 128. The primary clearance faces 125 form a primary clearance angle K1, and the secondary clearance face 126 forms a secondary clearance angle K2. The primary clearance angle K1 is larger than the secondary clearance angle K2. The top face 123 comprises chip breakers 129 and has a positive rake angle. As shown in FIG. 9A, the cutting insert 120 comprises a substantially round peripheral shape that is not perfectly round because of the minor extended portions 139 of the chip breakers 129. As used herein, however, the term "round" refers to cutting inserts having either perfectly round peripheral shapes or substantially round peripheral shapes within generally acceptable tolerances in the cutting tool industry.

Figure 9C:
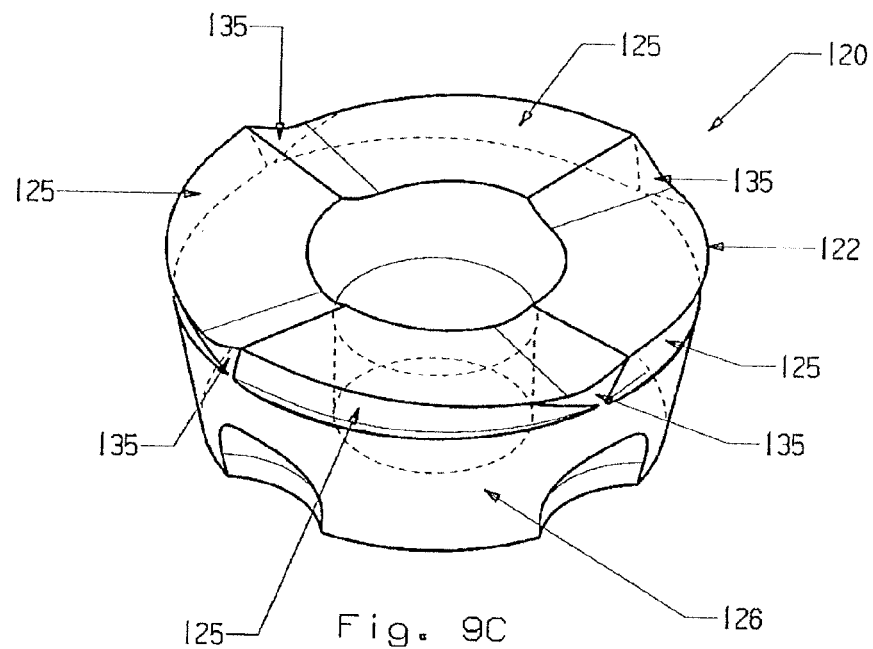
Figure 9D:
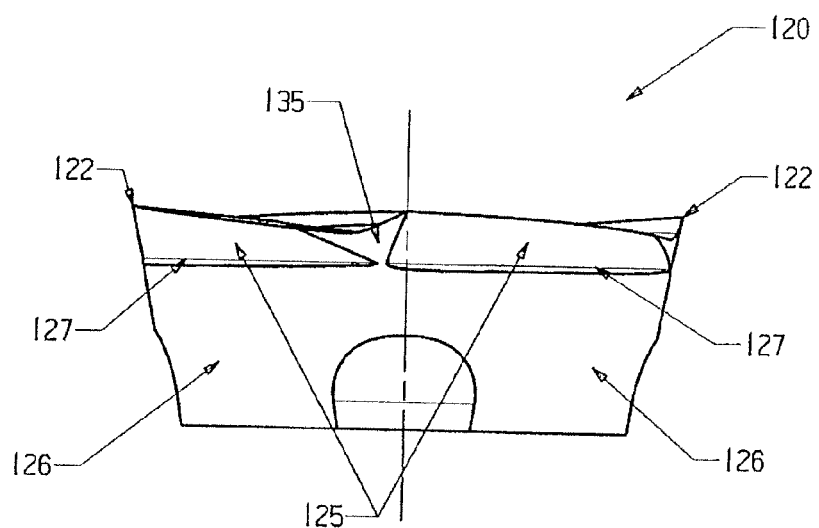

As shown in FIGS. 9C and 9D, the primary clearance faces 125 are not contiguous around the circular periphery of the cutting insert 120. The cutting insert 120 comprises four separate, discontiguous primary clearance faces 125, and the primary clearance faces 125 are separated by intermediate surfaces 135. Each separate, discontiguous primary clearance face 125 is separated from the peripherally-contiguous secondary clearance face by separate, discontiguous bridge surfaces 127, which provide the discontiguity between the primary and secondary clearance faces.

Figure 10A:
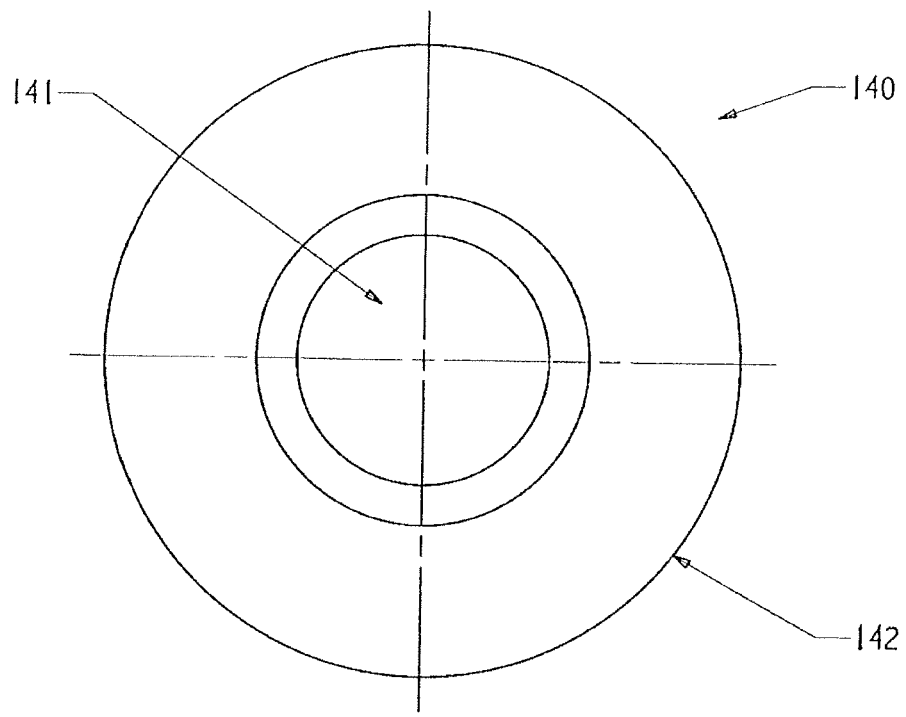
FIG. 10A is a top view and FIG. 10B is a side view of a single-sided round-shaped cutting insert comprising two discontiguous clearance faces having different clearance angles.
Figure 10B:
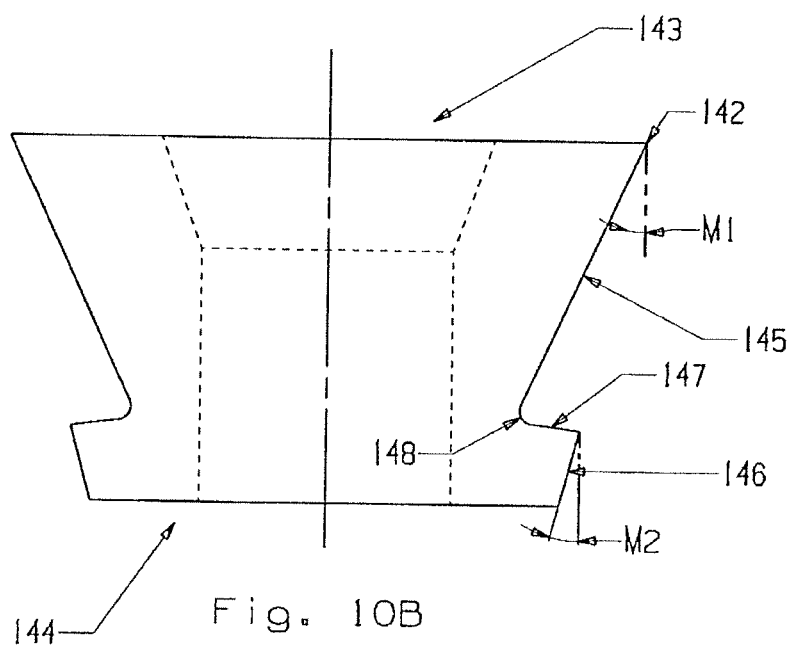

FIGS. 10A and 10B show a single-sided cutting insert 140 comprising a round peripheral shape. The cutting insert 140 comprises a top face 143, a bottom face 144, and two clearance faces 145 and 146 connecting the top face 143 and the bottom face 144 at the periphery of the cutting insert. A center mounting hole 141 is positioned through and between the top face 143 and the bottom face 144 and is configured to secure the cutting insert 140 to a cutting tool holder (not shown). The primary clearance face 145 is contiguous with the top face 143 and forms a cutting edge 142 at the intersection of the primary clearance face 145 and the top face 143. The primary clearance face 145 and the secondary clearance face 146 are discontiguous.

The primary clearance face 145 and the secondary clearance face 146 are separated by a bridge surface 147. The bridge surface 147 is contiguous with the primary clearance face 145 and the secondary clearance face 146, respectively, and provides the separating surface between the discontiguous clearance faces. As shown in FIG. 10B, the bridge surface 147 is contiguous with the primary clearance face 145 through arcuate surface 148. The primary clearance face 145 forms a primary clearance angle M1, and the secondary clearance face 146 forms a secondary clearance angle M2. The primary clearance angle M1 is larger than the secondary clearance angle M2. The primary clearance face 145 is relatively longer than the secondary clearance face 146 through a thickness dimension of the cutting insert 140. The smaller secondary clearance angle relative to the primary clearance angle provides a stronger base to the cutting insert 140, which is advantageous in embodiments comprising relatively long primary clearance faces 145 and/or relative large primary clearance angles M1.

Figure 15A:
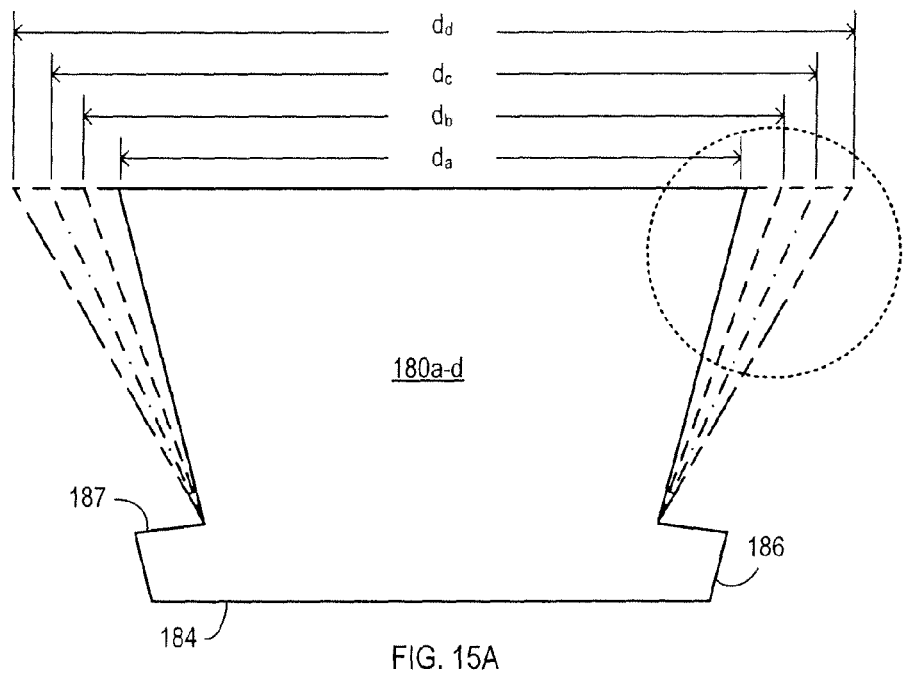
FIGS. 15A and 15B are schematic diagrams providing a side view and a detailed view, respectively, of four cutting inserts, each cutting insert comprising two discontiguous clearance faces, and the four cutting inserts having different primary clearance angles and different inscribed circle diameters.
Figure 15B:
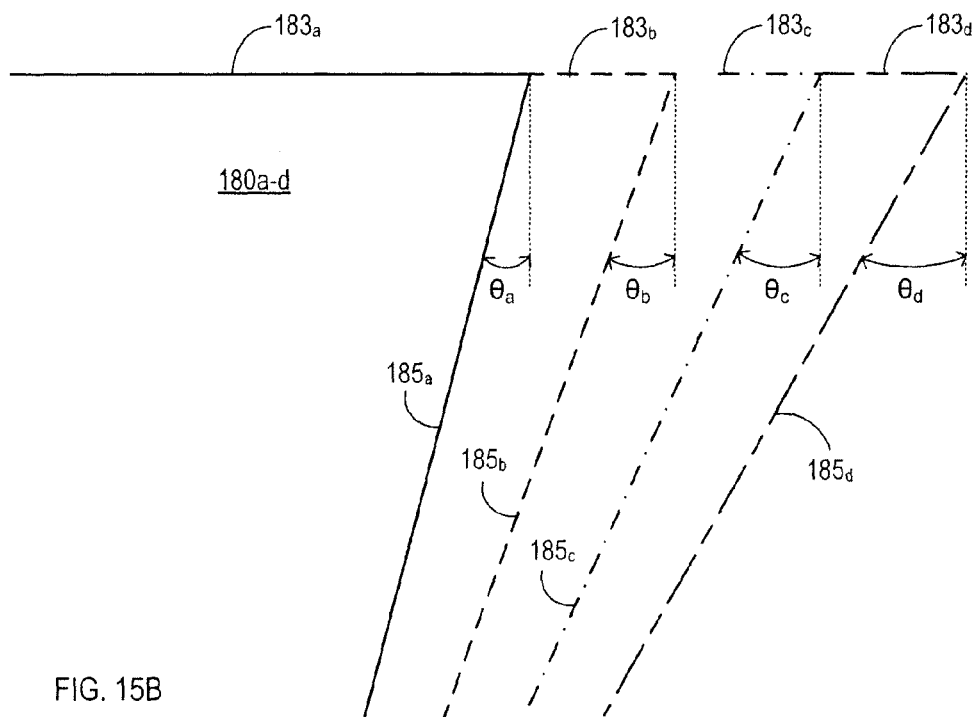

FIGS. 15A and 15B schematically illustrate four cutting inserts 180a, 180b, 180c, and 180d (180a-d) having different inscribed circle diameters ($d_a$, $d_b$, $d_c$, and $d_d$, respectively), different primary clearance faces (185a, 185b, 185c, and 185d, respectively), and different primary clearance angles ($\theta_a$, $\theta_b$, $\theta_c$, and $\theta_d$, respectively). The cutting inserts 180a-d may comprise any peripheral shape such as, for example, round, triangular, trigonal, rectangular, square, parallelogram-shaped, pentagonal, hexagonal, octagonal, and asymmetric peripheral shapes. The cutting inserts 180a-d comprise a bottom face 184, top faces 183a-d, and two clearance faces: a secondary clearance face 186 and primary clearance faces 185a-d, respectively. A center mounting hole (not shown) is positioned through and between the bottom face 184 and the top faces 183a-d and is configured to secure the cutting inserts 180a-d to a cutting tool holder (not shown).

The primary clearance faces 185a-d are contiguous with the top faces 183a-d, respectively, and form cutting edges at the intersection of the respective top face and the respective primary clearance face. The secondary clearance face 186 is discontiguous with the primary clearance faces 185a-d. The secondary clearance face 186 and the primary clearance faces 185a-d are separated by a bridge surface 187. The bridge surface 187 is contiguous with the primary clearance faces 185a-d and the secondary clearance face 186, and provides the separating surface between the discontiguous clearance faces. The primary clearance faces 185a-d form different primary clearance angles $\theta_a$, $\theta_b$, $\theta_c$, and $\theta_d$, respectively. The secondary clearance face 186 forms a secondary clearance angle. The primary clearance angles 185a-d are larger than the secondary clearance angle.

Figure 16A:
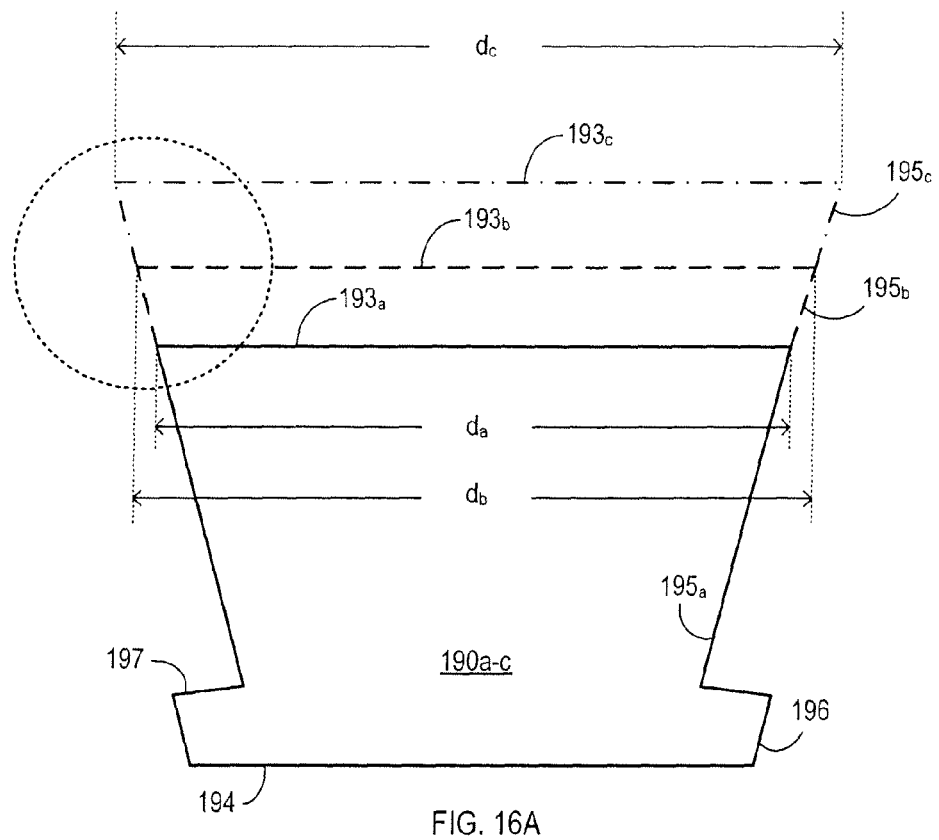
FIGS. 16A and 16B are schematic diagrams providing a side view and a detailed view, respectively, of three cutting inserts, each cutting insert comprising two discontiguous clearance faces, and the three cutting inserts having the same primary clearance angle and different inscribed circle diameters.
Figure 16B:
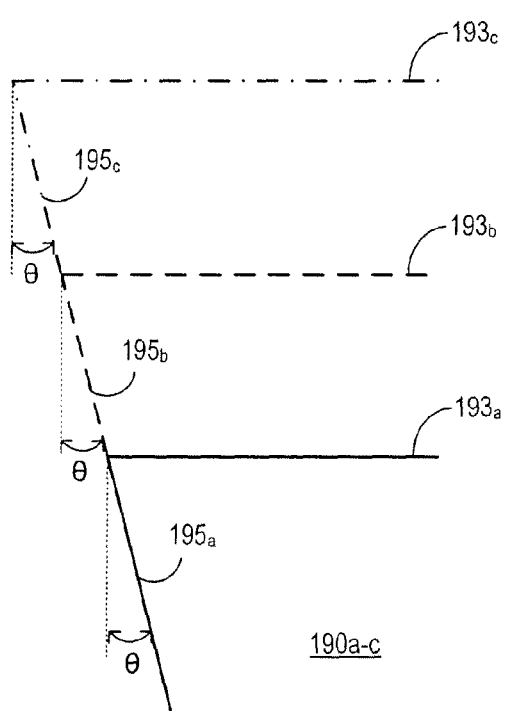
Figure 17A:
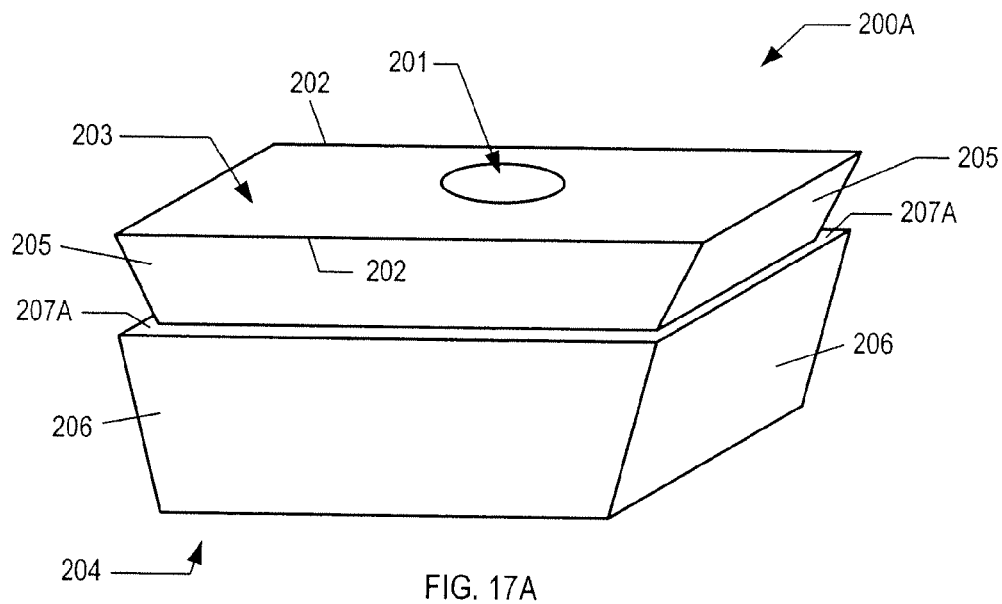
FIGS. 17A to 17D are three-dimensional perspective views of cutting inserts comprising two discontiguous clearance faces in which the discontiguity is provided by differently-contoured intermediate bridge surfaces.
Figure 17B:
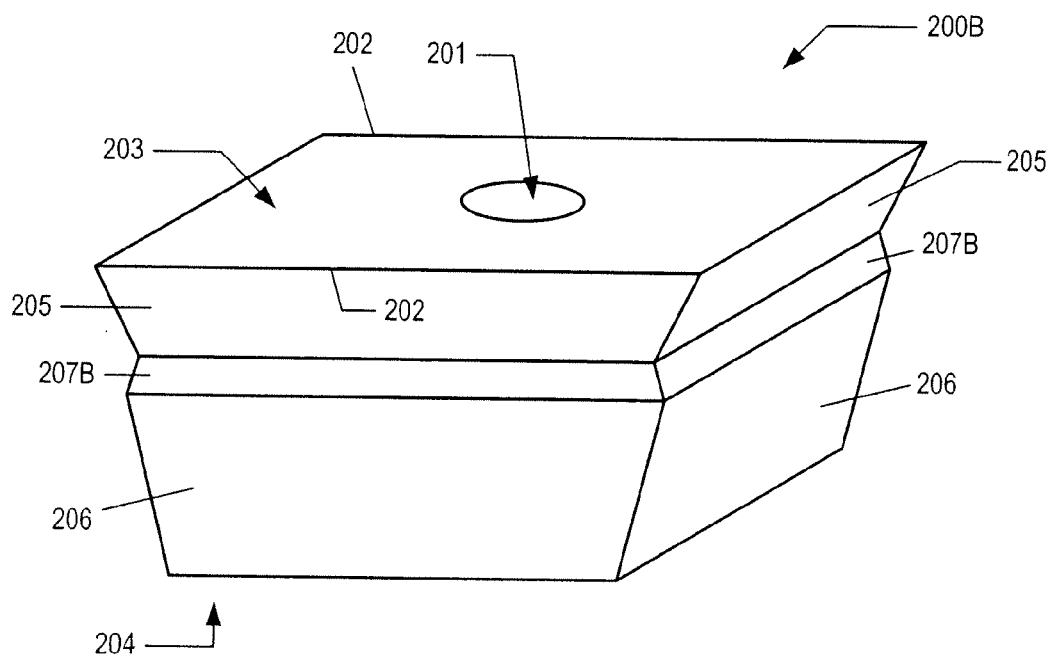
Figure 17C:
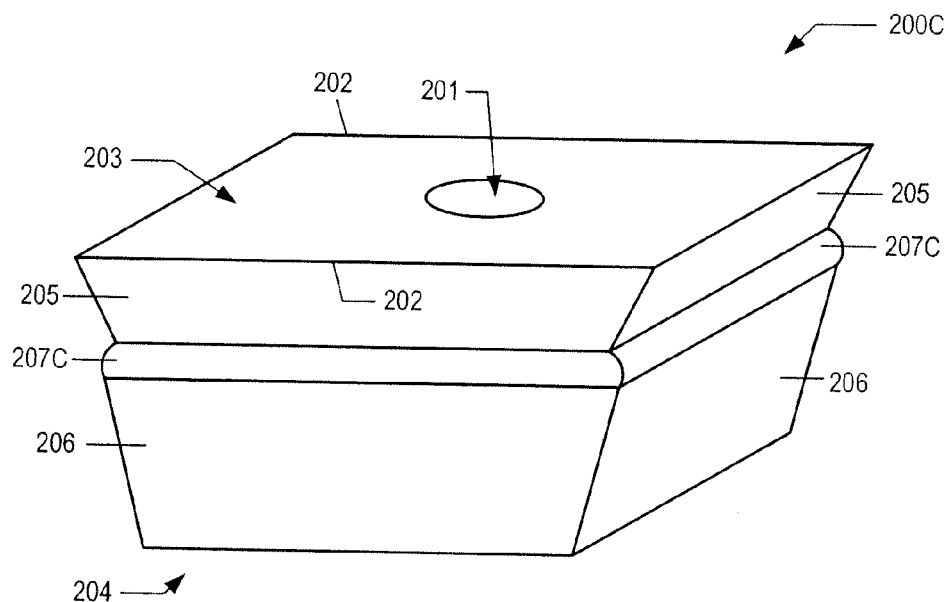
Figure 17D:
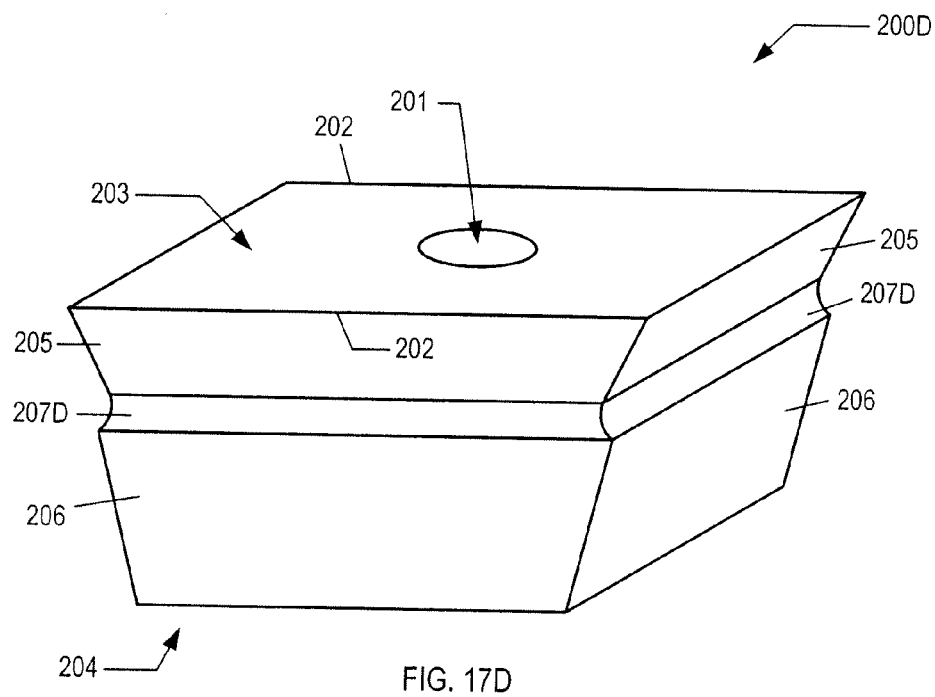

FIGS. 16A and 16B schematically illustrate three cutting inserts 190a, 190b, and 190c (190a-c) having different inscribed circle diameters ($d_a$, $d_b$, and $d_c$, respectively), different primary clearance faces (195a, 195b, and 195c, respectively), and the same primary clearance angle ($\theta$). The cutting inserts 190a-c may comprise any peripheral shape such as, for example, round, triangular, trigonal, rectangular, square, parallelogram-shaped, pentagonal, hexagonal, octagonal, and asymmetric peripheral shapes. The cutting inserts 190a-c comprise a bottom face 194, top faces 193a-c, and two clearance faces: a secondary clearance face 196 and primary clearance faces 195a-c, respectively. A center mounting hole (not shown) is positioned through and between the bottom face 194 and the top faces 193a-c and is configured to secure the cutting inserts 190a-c to a cutting tool holder (not shown).

The primary clearance faces 195a-c are contiguous with the top faces 193a-c, respectively, and form cutting edges at the intersection of the respective top face and the respective primary clearance face. The secondary clearance face 196 is discontiguous with the primary clearance faces 195a-c. The secondary clearance face 196 and the primary clearance faces 195a-c are separated by bridge surface 197. The bridge surface 197 is contiguous with the primary clearance faces 195a-c and the secondary clearance face 196, and provides the separating surface between the discontiguous clearance faces. The primary clearance faces 195a-c form the same primary clearance angle ($\theta$). The secondary clearance face 196 forms a secondary clearance angle. The primary clearance angle is larger than the secondary clearance angle.

FIGS. 17A through 17D show cutting inserts 200A, 200B, 200C, and 200D, respectively, the cutting inserts comprising a square peripheral shape. The cutting inserts 200A-D comprise a top face 203, a bottom face 204, and two clearance faces 205 and 206 connecting the top face 203 and the bottom face 204 at the periphery of the cutting insert. A center mounting hole 201 is positioned through and between the top face 203 and the bottom face 204 and is configured to secure the cutting inserts 200A-D to a cutting tool holder (not shown). The primary clearance face 205 is contiguous with the top face 203 and forms a cutting edge 202 at the intersection of the primary clearance face 205 and the top face 203. The primary clearance face 205 and the secondary clearance face 206 are discontiguous. The primary clearance face 205 forms a primary clearance angle, and the secondary clearance face 206 forms a secondary clearance angle. The primary clearance angle is larger than the secondary clearance angle.

The primary clearance face 205 and the secondary clearance face 206 are separated by a bridge surface 207A, 207B, 207C, or 207D. The bridge surfaces 207A-D are contiguous with the primary clearance face 205 and the secondary clearance face 206, respectively, and provide the separating surface between the discontiguous clearance faces. Cutting inserts 200A-D differ from each other in the configuration of the respective bridge surfaces 207A-D. As shown in FIG. 16A, bridge surface 207A is a planar-contoured surface that is parallel with the top surface 203 and the bottom surface 204. As shown in FIG. 16B, bridge surface 207B is a planar-contoured surface that is not parallel with the top surface 203 and the bottom surface 204. As shown in FIG. 16C, bridge surface 207C is a non-planar convex arcuate-contoured surface. As shown in FIG. 16D, bridge surface 207D is a non-planar concave arcuate-contoured surface.

In various non-limiting embodiments, cutting inserts comprising at least two discontiguous clearance surfaces may comprise at least one bridge surface that comprises a planar-contoured surface, an arcuate-contoured surface, or any combination of planar-contoured and arcuate-contoured surface segments, which provide at least one separating surface between the discontiguous clearance faces. For example, FIGS. 4B, 5B, 8A, 8B, 12A, 12B, 15A, and 16A show cutting inserts comprising planar-contoured bridge surfaces, but it is understood that such non-limiting embodiments may alternatively comprise bridge surfaces comprising an arcuate-contoured surface or any combination of planar-contoured and arcuate-contoured surface segments. For instance, FIG. 9B shows an arcuate-contoured bridge surface and FIG. 10B shows a bridge surface comprising a combination of a planar-contoured surface segment and an arcuate-contoured surface segment.

Figure 18A:
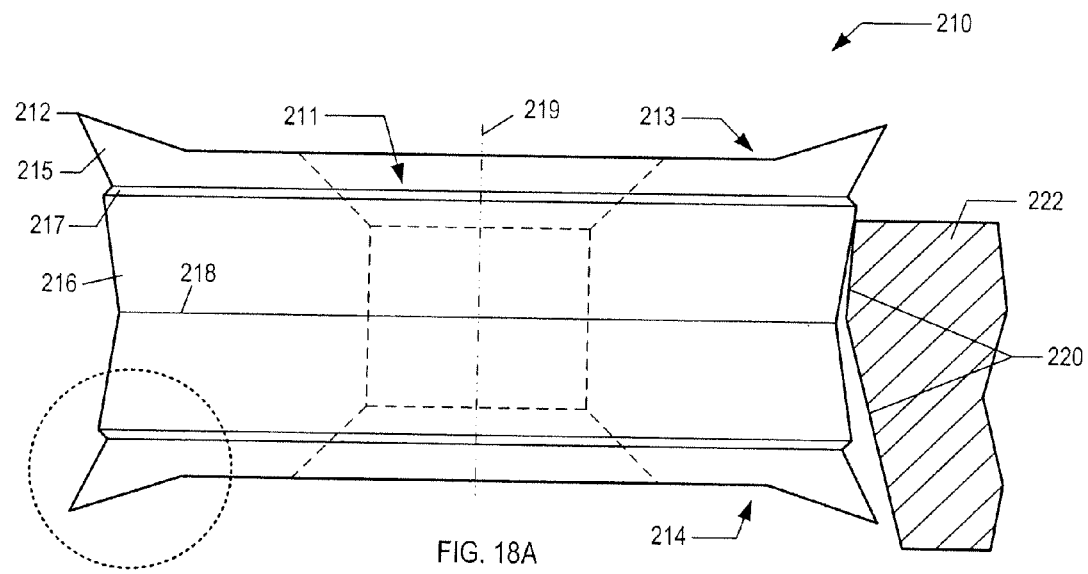
FIGS. 18A and 18B are schematic diagrams providing a side view and a detailed view, respectively, of a double-sided cutting insert, each side comprising two discontiguous clearance faces having different clearance angles.
Figure 18B:
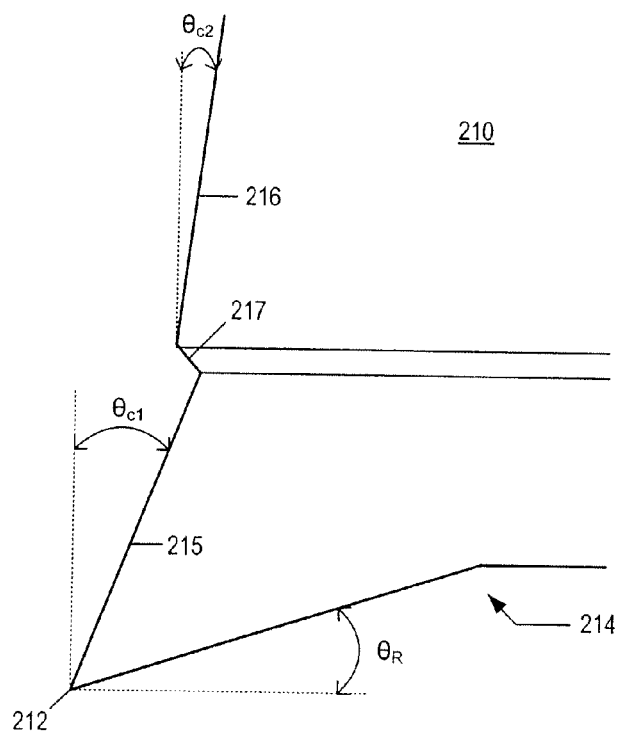

FIGS. 18A and 18B show a double-sided cutting insert 210, which may comprise any peripheral shape such as, for example, round, triangular, trigonal, rectangular, square, parallelogram-shaped, pentagonal, hexagonal, octagonal, and asymmetric peripheral shapes. The cutting insert 210 comprises a top face 203 and a bottom face 204. A center mounting hole 211 is positioned through and between the top face 213 and the bottom face 214 and is configured to secure the cutting insert 210 to a cutting tool holder (not shown).

The cutting insert 210 is mirror symmetric through middle plane 218. In various non-limiting embodiments, the cutting insert 210 is directly mirror symmetric through middle plane 218 without any off-setting rotation about axis 219, which is a central axis co-linear with the mounting hole 211. In various non-limiting embodiments, the cutting insert 210 is indirectly mirror symmetric through middle plane 218 with an off-setting rotation of a predetermined angle about axis 219. The portion of the cutting insert 210 between the middle plane 218 and the top face 213 is referred to as the top portion of the insert, and the portion of the cutting insert 210 between the middle plane 218 and the bottom face 214 is referred to as the bottom portion of the insert. However, these labels are for purposes of convenience only because the top portion and the bottom portion of the double-sided cutting insert 210 are structurally and functionally equivalent when used in an indexable cutting tool system. This is also true for the double-sided cutting insert embodiments described above in connection with FIGS. 3B, 5B, and 7A-C.

The top portion and the bottom portion of the cutting insert 210 each comprise two discontiguous clearance faces: a primary clearance face 215 and a secondary clearance face 216. The primary clearance face 215 is contiguous with the top face 213 and forms a cutting edge 212 at the intersection of the primary clearance face 215 and the top face 213. The primary clearance face 215 and the secondary clearance face 216 are separated by a bridge surface 217. The bridge surface 217 is contiguous with the primary clearance face 215 and the secondary clearance face 216, respectively, and provides the separating surface between the discontiguous clearance faces. The primary clearance face 215 forms a primary clearance angle $\theta_{c1}$, and the secondary clearance face 216 forms a secondary clearance angle $\theta_{c2}$. The primary clearance angle $\theta_{c1}$ is larger than the secondary clearance angle $\theta_{c1}$. The top face 213 and the bottom face 214 each form a rake angle $\theta_R$.

While the bridge surface 217 is shown in FIGS. 18A and 18B as a planar-contoured surface, it is understood that analogous embodiments may comprise bridge surfaces comprising an arcuate-contoured surface or any combination of planar-contoured and arcuate-contoured surface segments. Additional embodiments of the cutting insert 210 (not shown) may be produced by independently varying the inscribed circle diameter and/or the primary clearance angle of the top portion and/or the bottom portions of the cutting insert, for example, in the manner illustrated and described in connection with FIGS. 8A, 8B, 15A, 15B, 16A, and 15B.

FIG. 18A shows a portion of an insert pocket 222 of a cutting tool holder (now shown) comprising a pocket wall 220 engaging and supporting the secondary clearance face 216. In this manner, a plurality of different cutting inserts comprising different inscribed circle diameters, different primary clearance faces, and/or different primary clearance angles may fit into a common insert pocket and, therefore, a single tool holder. This reduces the numbers of corresponding tool holders required to support different cutting inserts, which may provide significant cost reduction for both cutting tool manufacturers and cutting tool users.

In various non-limiting embodiments, the cutting inserts described in this specification may have positive cutting geometry, i.e., positive clearance face geometry and positive rake face geometry or neutral rake face geometry. In certain of the embodiments described above and illustrated in the accompanying drawings, the top faces of single-sided cutting inserts, and both the top and bottom faces of double-sided cutting inserts, are shown as having neutral rake angles and lacking chip breakers. However, it is understood that all of the embodiments described and illustrated in this specification, including the drawings, may comprise positive rake angles and/or chip breakers.

In various non-limiting embodiments, the cutting inserts described in this specification may also comprise corner noses, varying rake angles, and the like, as described, for example, in U.S. Pat. Nos. 5,145,295; 6,193,446; and 7,905,689, which are incorporated by reference into this specification.

Indexable cutting inserts comprising discontiguous clearance faces in accordance with various embodiments described in this specification may provide the following advantages, among others, in rotary machining applications:

Cutting inserts having the same inscribed circle (IC) diameter but different primary clearance angles will fit into a common insert pocket and, therefore, a single tool holder may accommodate multiple differently-shaped cutting inserts; and Cutting inserts having different inscribed circle (IC) diameters and the same or different primary clearance angles will fit into a common insert pocket and, therefore, a single tool holder may accommodate multiple differently-shaped cutting inserts.

Cutting tool systems comprising multiple differently-shaped cutting inserts that fit into a single tool holder may benefit both cutting tool manufacturers and cutting tool users in terms of inventory and cost reduction relative to prior systems. Further, multiple discontiguous clearance faces are applicable to cutting inserts with varying peripheral shapes and overall sizes.

In various non-limiting embodiments, a cutting tool system comprises an indexable cutting insert comprising at least two discontiguous clearance faces and a tool holder configured to secure the cutting insert in an insert pocket. The cutting tool system may comprise a plurality of cutting inserts comprising at least two discontiguous clearance faces. The plurality of cutting inserts may comprise at least two groups of different inserts, the difference being at least one of inscribed circle diameter and primary clearance angle. The tool holder may be configured to secure the different cutting inserts in a common insert pocket. For example, the insert pocket in the tool holder may accommodate and secure cutting inserts having different inscribed circle diameters. Alternatively or in addition, the insert pocket in the tool holder may accommodate and secure cutting inserts having different primary clearance angles.

Various non-limiting embodiments described in this specification are directed to cutting inserts comprising at least two discontiguous clearance faces, and to cutting tool systems comprising the cutting inserts. In various embodiments, a primary clearance face forms a primary clearance angle that is larger than a secondary clearance angle formed by a secondary clearance face. It is understood, that cutting inserts within the scope of this specification may be embodied in forms and applied to end uses that are not specifically and expressly described herein. For example, a person having ordinary skill in the art, upon consideration of this specification, will understand that embodiments within the scope of this specification may be produced as cutting inserts configured for various material removal methods such as milling, drilling, boring, threading, thread milling, turning, cut-off, and the like. Further, the cutting inserts described in this specification may be manufactured in conventional or non-conventional sizes and configured for conventional or non-conventional use in various machining applications.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. §112, first paragraph, and 35 U.S.C. §132(a).

What is claimed is:

1. An indexable cutting insert comprising:
    a top face;
    a bottom face; and
    at least two clearance faces connecting the top face and the bottom face at a periphery of the cutting insert, the at least two clearance faces comprising:
        a primary clearance face contiguous with the top face and forming a cutting edge at an intersection of the primary clearance face and the top face;
        a secondary clearance face discontiguous with the primary clearance face; and
    a bridge surface separating the primary clearance face and the secondary clearance face, wherein the bridge surface does not form a cutting edge with the secondary clearance face,
    wherein a primary clearance angle formed by the primary clearance face is larger than a secondary clearance angle formed by the secondary clearance face.

2. The indexable cutting insert of claim 1, wherein the top face forms a positive rake angle.

3. The indexable cutting insert of claim 1, wherein the primary clearance angle and the secondary clearance angle are positive clearance angles.

4. The indexable cutting insert of claim 1, wherein the bridge surface comprises a planar-contoured surface, an arcuate-contoured surface, or a combination of planar-contoured and arcuate-contoured surface segments.

5. The indexable cutting insert of claim 1, wherein the cutting insert is a single-sided cutting insert.

6. The indexable cutting insert of claim 1, wherein the cutting insert comprises at least three clearance faces connecting the top face and the bottom face at a periphery of the cutting insert, the at least three clearance faces comprising:
a first primary clearance face contiguous with the top face and forming a first cutting edge at the intersection of the first primary clearance face and the top face;
a second primary clearance face contiguous with the bottom face and forming a second cutting edge at an intersection of the second primary clearance face and the bottom face; and
a secondary clearance face discontiguous with the first primary clearance face and the second primary clearance face, the secondary clearance face separated from the first primary clearance face by a first bridge surface, and the secondary clearance face separated from the second primary clearance face by a second bridge surface.

7. The indexable cutting insert of claim 6, wherein the top face and the bottom face each form a positive rake angle.

8. The indexable cutting insert of claim 6, wherein a first primary clearance angle formed by the first primary clearance face, a second primary clearance angle formed by the second primary clearance face, and the secondary clearance angle are positive clearance angles.

9. The indexable cutting insert of claim 6, wherein the first bridge surface and the second bridge surface independently comprise a planar-contoured surface, an arcuate-contoured surface, or a combination of planar-contoured and arcuate-contoured surface segments.

10. The indexable cutting insert of claim 6, wherein a first primary clearance angle formed by the first primary clearance face is larger than the secondary clearance angle formed by the secondary clearance face, and wherein a second primary clearance angle formed by the second primary clearance face is larger than the secondary clearance angle formed by the secondary clearance face.

11. The indexable cutting insert of claim 6, wherein the cutting insert is a double-sided cutting insert having mirror symmetry through a middle plane located between the top face and the bottom face.

12. The indexable cutting insert of claim 1, wherein the cutting insert comprises at least four clearance faces connecting the top face and the bottom face at a periphery of the cutting insert, the at least four clearance faces comprising:
a first primary clearance face contiguous with the top face and forming a first cutting edge at the intersection of the first primary clearance face and the top face;
a first secondary clearance face discontiguous with the first primary clearance face, the first secondary clearance face separated from the first primary clearance face by a first bridge surface;
a second primary clearance face contiguous with the bottom face and forming a second cutting edge at an intersection of the second primary clearance face and the bottom face; and
a second secondary clearance face discontiguous with the second primary clearance face, the second secondary clearance face separated from the second primary clearance face by a second bridge surface.

13. The indexable cutting insert of claim 12, wherein a first primary clearance angle formed by the first primary clearance face is larger than a first secondary clearance angle formed by the first secondary clearance face, and wherein a second primary clearance angle formed by the second primary clearance face is larger than a second secondary clearance angle formed by the second secondary clearance face.

14. The indexable cutting insert of claim 12, wherein the cutting insert is a double-sided cutting insert having mirror symmetry through a middle plane located between the top face and the bottom face.

15. The indexable cutting insert of claim 1, wherein the cutting insert has a peripheral shape selected from the group consisting of round, triangular, trigonal, square, rectangular, parallelogram-shaped, pentagonal, hexagonal, and octagonal.

16. The indexable cutting insert of claim 1, wherein the cutting insert is a cutting insert selected from the group consisting of a milling insert, a turning insert, a drilling insert, a threading insert, a cut-off insert, a thread milling insert, and a boring insert.

17. A cutting tool system comprising:
an indexable cutting insert in accordance with claim 1; and
a tool holder configured to secure the cutting insert in an insert pocket.

18. The cutting tool system of claim 17, comprising a plurality of cutting inserts in accordance with claim 1, the plurality of cutting inserts comprising at least two groups of different inserts, the difference being at least one of inscribed circle diameter and primary clearance angle, and the tool holder configured to secure the different cutting inserts in the insert pocket.

19. The cutting tool system of claim 18, wherein the insert pocket accommodates and secures cutting inserts having different inscribed circle diameters.

20. The cutting tool system of claim 18, wherein the insert pocket accommodates and secures cutting inserts having different primary clearance angles.

21. A cutting tool system comprising:
a plurality of cutting inserts, each cutting insert comprising:
a primary clearance face contiguous with a rake face and forming a cutting edge at an intersection with the rake face;
a secondary clearance face discontiguous with the primary clearance face; wherein a primary clearance angle formed by the primary clearance face is larger than a secondary clearance angle formed by the secondary clearance face; and
a bridge surface separating the primary clearance face and the secondary clearance face, wherein the bridge surface does not form a cutting edge with the secondary clearance face; and
a tool holder configured to secure each of the plurality of cutting inserts in an insert pocket,
wherein the plurality of cutting inserts comprise at least two groups of different inserts, the difference being at least one of inscribed circle diameter and primary clearance angle, and tool holder configured to secure the different cutting inserts in the insert pocket.

22. The cutting tool system of claim 21, wherein each cutting insert is an indexable cutting insert.

23. The cutting tool system of claim 21, wherein the bridge surface comprises a planar-contoured surface, an arcuate-contoured surface, or a combination of planar-contoured and arcuate-contoured surface segments.

24. The cutting tool system of claim 21, wherein the rake face forms a positive rake angle.

25. The cutting tool system of claim 21, wherein the primary clearance angle and the secondary clearance angle are positive clearance angles.

26. The cutting tool system of claim 21, wherein each cutting insert is a single-sided cutting insert.

27. The cutting tool system of claim 21, wherein each cutting insert is a double-sided cutting insert.

28. The cutting tool system of claim 21, wherein each cutting insert is a double-sided cutting insert having mirror symmetry through a middle plane located between two opposed rake faces.

29. The tool system of claim 21, wherein each cutting insert has a peripheral shape selected from the group consisting of round, triangular, trigonal, square, rectangular, parallelogram-shaped, pentagonal, hexagonal, and octagonal.

30. The cutting tool system of claim 21, wherein each cutting insert is a cutting insert selected from the group consisting of a milling insert, a turning insert, a drilling insert, a threading insert, a cut-off insert, a thread milling insert, and a boring insert.

31. The cutting tool system of claim 21, wherein the insert pocket accommodates and secures cutting inserts having different inscribed circle diameters.

32. The cutting tool system of claim 21, wherein the insert pocket accommodates and secures cutting inserts having different primary clearance angles.

\* \* \* \* \*